United States Patent Office 3,268,556
Patented August 23, 1966

3,268,556
NOVEL LINCOMYCIN DERIVATIVES
Herman Hoeksema, Cooper Township, Kalamazoo County, Mich., assignor to The Upjohn Company, Kalamazoo, Mich., a corporation of Delaware
No Drawing. Filed Dec. 21, 1964, Ser. No. 420,104
16 Claims. (Cl. 260—326.3)

This application is a continuation-in-part of applications Serial No. 359,488 and Serial No. 359,447, both filed April 13, 1964, and Serial No. 369,599, filed May 22, 1964, now all abandoned.

This invention relates to novel compositions of matter and is particularly concerned with N-(1,4-dialkylprolyl) lincosamine dialkyl mercaptals (II) [6,8-dideoxy-6-(1,4-dialkyl - 2 - pyrrolidinecarboxamido) - D - erythro - D-galacto-aldehydo-octose dialkyl dithioacetals] and the 7-O-methyl ether thereof; N-(1,4-dialkylprolyl)-1-deoxylincosaminols (III) [1,6,8 - trideoxy - 6 - (1,4 - dialkyl - 2-pyrrolidinecarboxamido) - D - erythro - D - galacto - octitols] and the 7-O-methyl ether thereof; 1-deoxylincosaminol (IV) [6-amino-1,6,8-trideoxy-D-erythro-D-galacto-octitol] and the 7-O-methyl ether thereof; N-acyl-1-deoxylincosaminols (V) [6-acylamino-1,6,8-trideoxy-D-erythro-D-galacto-octitols] and the 7-O-methyl ether thereof; and N-(1,4-dialkylprolyl)-1-alkylthio-1-deoxylincosaminols (VI) [1,6,8 - trideoxy - 1 - alkylthio - 6 - (1, 4 - dialkyl - 2 - pyrrolidinecarboxamido) - D - erythro-D-galacto-octitols] and the 7-O-methyl ether thereof; and a process for the production thereof.

In the compounds where the 1,4-dialkylproplyl group is 4-alkyl-1-methylprolyl, the term "4-alkylhygroyl" is alternatively used. The term "hygroyl" designates the acyl radical of hygric acid (1-methylproline) and has (in the L-configuration) the formula:

The novel compounds of this invention and the process for the production thereof can be illustratively represented in the following manner:

wherein R is selected from the group consisting of hydrogen and methyl, wherein $R_1$ and $R_2$ are selected from the group consisting of alkyl radicals having from 1 to 18 carbon atoms, inclusive, and benzyl and thenyl, wherein $R_3$ is selected from the group consisting of methyl, ethyl, and 2-hydroxyethyl, and wherein $R_4$ and $R_5$ are alkyl radicals having from 1 to 12 carbon atoms, inclusive.

The process of the present invention comprises: treating a compound of Formula I, e.g., lincomycin hydrochloride (U.S. Patent 3,086,902) with a compound selected from the group consisting of alkanethiol, benzyl mercaptan and thenyl mercaptan, and concentrated hydrochloric acid to obtain the corresponding N-(1,4-dialkylprolyl)lincosamine mercaptal (II); treating compound (II) with an active nickel catalyst, such as Raney nickel, in a lower alkanol having from 1 to 6 carbon atoms, inclusive, such as ethanol, to obtain N-(1,4-dialkylprolyl)-1-deoxylincosaminol (III); hydrolyzing compound (III) with a mineral acid or with hydrazine to obtain 1-deoxylincosaminol (IV); treating compound (IV) with an acylating agent selected from an acid anhydride and an acyl halide of a hydrocarbon carboxylic acid containing from 2 to 12 carbon atoms, inclusive, under conditions which effect acylation of the amino group only to give the corresponding N-acyl-1-deoxylincosaminol (V). Mild conditions of desulfurization of N-(1,4-dialkylproplyl)lincosamine mercaptal II give an alkylthio compound of Formula VI.

The novel N-acyl-1-deoxylincosaminols of Formula V have antimicrobial activity and can also be used as intermediates for the production of valuable amino acids. For example, N-benzoyl-1-deoxylincosaminol inhibits the growth of *Trichophyton rubrum* and *Alternaria solani*, which latter is responsible for tomato blight. The animicrobial activity of the novel compounds can be utilized for washing equipment in hospitals and homes, medical and surgical instruments, and instruments used in bacteriology, as well as clothing used in laboratories specializing in the cultivation and use of microorganisms. Similarly, in locations where sterile backgrounds are necessary, floors, walls and ceilings can be washed with aqueous solutions of these compounds. Furthermore, the compounds can be used in sprays for tomato plants to prevent tomato blight.

The novel compounds of Formula V are further useful in the production of other novel compounds possessing a variety of activities, for example, N-acetyl-1-deoxylincosaminol may be used in the production of commercially important amino acids such as threonine and allothreonine.

The novel compound, N-(4-propyl-L-hygroyl)-1-methylthio-1-deoxylincosaminol VI ($R_1$ and $R_5$ are methyl, $R_4$ is propyl) has a general stimulating activity on the central nervous system. It is useful in lifting animals out of lethargic states caused by disease, confinement during travel or captivity, or, in the case of domestic pets, change of ownership. Under such circumstances animals often lose appetite, which can go as far as to cause the death of the animal. The novel product, given by injection in suspension, for example, in finely powdered form in cottonseed oil or by injection of the hydrochloride in aqueous solution will prevent such losses.

The novel compounds of Formulae II, III and VI in their quaternary ammonium salt forms, for example, as the methochloride or methobromide, having good wetting action and electrical conduction, can be used in suitable compositions as an electrocardiographic jelly. A suitable composition of an electrocardiographic jelly can be prepared as follows:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding the methochloride or methobromide of any of the compounds of Formulae II, III and VI.

The new compounds can also be used as an intermediate in the preparation of active antimicrobial agents. For example, the compound N-(4-propyl-L-hygroyl)-1-methylthio-1-deoxylincosaminol can be subjected to hydrazinolysis (treated with hydrazine hydrate) to give 1-methylthio-1-deoxylincosaminol. The latter can be reacted with 1-fluoro-2,4-dinitrobenzene to give N-(2,4-dinitrophenyl) - 1 - methylthio - 1 - deoxylincosaminol which has activity against plant pathogens, for example, *Alternaria solani*, the cause of tomato blight, and can be used in sprays against this organism.

Various acid addition salts of the free base form of the compounds of Formulae II, III, IV and VI can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2 - cyclohexanedicarboxylic, 4-cyclohexenecarboxylic, octadecenylsuccinic, octenylsuccinic, methanesulfonic, benzenesulfonic, helianthic, Reinecke's dimethyldithiocarbamic, cyclooctylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali. Instead of preparing a water-insoluble salt, the free base can be converted to a water-soluble salt, such as the hydrochloride or sulfate and the aqueous solution of the salt extracted with various water-immiscible solvents before regenerating the free base form by treatment of the thus-extracted acid solution or converting to another salt by metathesis.

The compounds of Formulae II, III, IV, V and VI can be used as buffers or as antacids. The compounds of Formulae II, III, IV, V and VI react with isocyanates to form urethanes and can be used to modify polyurethane resins. The long-chain substituted compounds, wherein $R_1$ is alkyl of from 8 carbon atoms up, have surface active properties and can be used as wetting and emulsifying agents. The thiocyanic acid addition salts when condensed with formaldehyde form resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

The starting materials of Formula I of this invention are prepared by either fermentation methods (A) or by a combination of fermentation and chemical methods (B).

(A) FERMENTATION METHODS

The following three antibiotics can be prepared by fermentation methods:

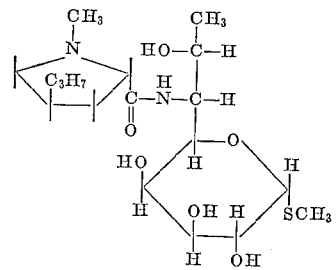

Lincomycin (VII)

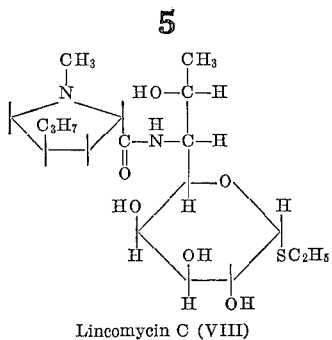

Lincomycin C (VIII)

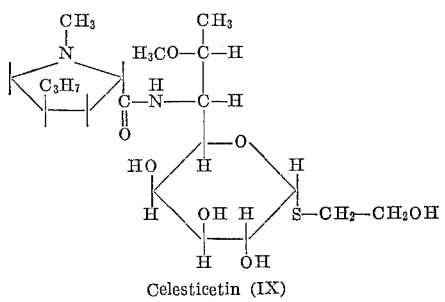

Celesticetin (IX)

Lincomycin (VII) and its hydrochloride salt are prepared by a fermentation process with *Streptomyces lincolnensis* var. *lincolnensis* as shown in U.S. Patent 3,086,912.

Celesticetin (IX) is prepared by a fermentation using *Streptomyces caelestis* as shown in U.S. Patent 2,928,844.

Lincomycin C (VIII) is prepared as shown in the Preparation 1 below:

PREPARATION 1

*Lincomycin C (VIII) and its hydrochloride*

FERMENTATION

A soil slant of *Streptomyces lincolnensis* var. *lincolnensis*, NRRL 2936, was used to inoculate a series of 500-ml. Erlenmeyer flasks, each containing 100 ml. of seed medium consisting of the following ingredients:

| | G. |
|---|---|
| Yeastolac [1] | 10 |
| Glucose monohydrate | 10 |
| N–Z-amine B [2] | 5 |
| Tap water, q.s. 1 l. | |

[1] Yeastolac is a protein hydrolysate of yeast cells.
[2] N–Z-amine B is Sheffield's enzymatic digest casein.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| | |
|---|---|
| Glucose monohydrate _____g__ | 15 |
| Starch _____g__ | 40 |
| Molasses _____g__ | 20 |
| Wilson's Peptone Liquor No. 159 [3] _____g__ | 10 |
| Corn steep liquor _____g__ | 20 |
| Calcium carbonate _____g__ | 8 |
| Lard oil _____ml__ | 0.5 |
| Tap water, q.s. 1 l. | |

[3] Wilson's Peptone Liquor No. 159 is a preparation of enzymatically hydrolyzed proteins from animal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. lutea* assay, hereinafter described. The whole beer solids was about 20 gm./liter.

In a similar manner, fermentations were run with L-ethionine substituted for DL-ethionine, and D-ethionine substituted for DL-ethionine.

PURIFICATION

Whole beer (235 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 l. of water and the water wash was discarded. The cake was washed with 70 l. of 20% aqueous acetone and the 20% aqueous acetone wash was discarded. The cake was then eluted twice with 100 l. portions of 90% aqueous acetone. The eluates were combined (215 l.) and the solution was concentrated (18 l.). This concentrate was adjusted to pH 10.0 with a 50% aqueous sodium hydroxide solution and extracted three times with 20 l. portions of methylene chloride. The methylene chloride extracts were combined (60 l.) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 l. of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. (The assay against *Sarcina lutea* is conducted on agar buffered to pH 6–8 to pH 7.0 phosphate buffer [0.1 M]). A unit volume [0.08 ml.] of solution containing the material to be assayed is placed on a 12.7 ml. assay disc which is then placed on an agar plate seeded with the assay microorganism. Thin layer chromatography showed the presence of both lincomycin hydrochloride and lincomycin C hydrochloride in approximately equal amounts.

Crude lincomycin C hydrochloride (7.0 g.), as obtained in Preparation 1, was dissolved in 20 ml. of water and 20 ml. of butanol, pH adjusted to 4.2 with 1 N HCl, and the solution distributed in a countercurrent distribution apparatus for 1000 transfers. Analysis by thin-layer chromatography showed that the fractions in tubes 135 to 190 contained lincomycin C. These fractions were combined, and the solution was concentrated and thereupon freeze dried to give 2.44 g. of lincomycin C hydrochloride assaying 1400 mcg./mg. against *Sarcina lutea*. 500 mg. of this preparation was dissolved in 2 ml. of water, 1 ml. of ethanol, and 100 ml. of acetone. The solution was clarified by filtration. The filtrate was mixed with ether until crystals appeared. The mixture was allowed to stand at room temperature for 1 hr. Crystalline (cubes) lincomycin C hydrochloride was separated from the supernatant material solution by decantation. These crystals were recrystallized from 1 ml. of water, 1 ml. of methanol, 80 ml. of acetone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride.

(B) FERMENTATION AND CHEMICAL METHODS

In this method the starting materials of Formula I are prepared by a combination of three syntheses: (1) preparation of the amino sugar moiety from the fermentation products above; (2) synthesis of 1,4-dialkylprolines; and (3) condensation of the amino sugar moiety with the dialkylprolines to give compound I. The Preparations 2–16 illustrate the synthesis of these products.

PREPARATION 2

(1) THE AMINO SUGARS—(a) Methyl α-thiolincosaminide (METHYL 6-AMINO-6,8-DIDEOXY-1-THIO-D-ERYTHRO-α-D-GALACTO-OCTOPYRANOSIDE)

(X)
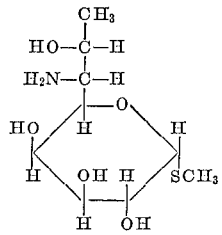

A solution of 40 g. of lincomycin (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 21 g. (84%). Recrystallization was accomplished by dissolving methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25}$ plus 276° (c.=.768, water) and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 3

(b) Ethyl α-thiolincosaminide (XI)
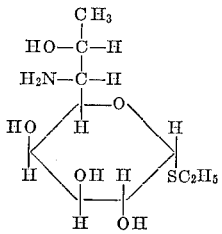

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pages 88 and 97 of Kunin, Ion Exchange Resins, 2nd ed. [1958], John Wiley & Sons, Inc., polystyrene crosslinked, if desired, with divinylbenzene, prepared by the procedures given on page 84 of Kunin, supra, and quaternizing with trimethylamine or dimethylethanolamine, by the procedure given on page 97 of Kunin, supra.) The alkaline solution was then freeze dried to a residue which was dissolved in 50 ml. of hydrazine hydrate (98–100%) and refluxed for 24 hours. The solution was then concentrated to dryness in vacuo and the residue triturated three times with 10 ml. portions of acetonitrile. The insoluble material was collected and dried; yield, 900 mg. A solution of 600 mg. of the dried insoluble material in 4 ml. of dimethylformamide (heat was used to promote solution) was then clarified by filtration and the filtrate was held at room temperature for 4 hours. The crystalline ethyl α-thiolincosaminide which precipitated was isolated by filtration, washed with ether and dried; yield, 500 mg.

Ethyl α-thiolincosaminide has the following physical and chemical characteristics: melting point 191–195° C.; optical rotation $[\alpha]_D^{25}$ plus 258° (c., 0.76 in water); and pKa'=7.17, and the following elemental analysis:

Calcd. for $C_{10}H_{21}NO_5S$: C, 44.93; H, 7.92; N, 5.24; S, 11.99; O, 29.92. Found: C, 44.09; H, 7.91; N, 5.24; S, 11.32.

PREPARATION 4

(c) 2-hydroxyethyl α-thiocelestosaminide (XII)
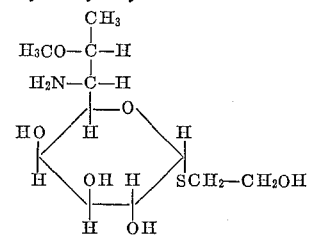

A mixture of 5 g. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 g.) of 2-hydroxyethyl α-thiocelestosaminide hydrazine solvate were obtained which melted at 98–108° C. Recrystallization from absolute ethanol gave 0.65 g. having an optical rotation of $[\alpha]_D^{25}$ plus 243° (c.=0.8, water); an infrared absorption spectrum in Nujol mull at the following frequencies: 3400, 1630, 1600, 1460, 1450 (sh.), 1305, 1275, 1260, 1200, 1115, 1085, 1055, 1010, 978, 950, 925, 910 873, 800–820, 705, 690, and 680 cm.$^{-1}$; an equivalent weight of 161 with two basic groups having pKa"s in the region of 7.5; and the following elemental analysis:

*Analysis.*—Calcd. for $C_{11}H_{23}NO_6S \cdot N_2H_4$: C, 40.11; H, 8.26; N, 12.76; S, 9.74. Found: C, 40.15; H, 8.04; N, 11.69; S, 9.56.

A solution of 2 g. of 2-hydroxyethyl α-thiocelestosaminide hydrazine solvate in 30 ml. of dimethylformamide was concentrated to a volume of about 10 ml. and then diluted with 10 ml. of dimethylformamide. Ether was added until cloudiness resulted, and 500 mg. of 2-hydroxyethyl α-thiocelestosaminide was deposited. The crystalline 2-hydroxyethyl α-thiocelestosaminide had an optical rotation of $[\alpha]_D^{25}$ plus 262° (c.=1, in water); an infrared absorption spectrum at the following frequencies: 3400 (sh.), 3250, 1600, 1400, 1325, 1310, 1290, 1240, 1195, 1160, 1150 (sh.), 1110, 1100, 1075, 1045, 1038, 1005, 980, 920, 895, 862, 825, 796, 740, 711 and 690 cm.$^{-1}$; an equivalent weight of 297; pKa' of 7.2; and the following elemental analysis:

*Analysis.*—Calcd. for $C_{11}H_{23}NO_6S$: C, 44.43; H, 7.80; N, 4.71; S, 10.78. Found: C, 44.20; H, 7.78; N, 4.97; S, 10.68.

(2) Synthesis of 1,4-dialkylprolines

This synthesis can be carried out with known 4-ketoprolines as starting materials and schematically can be represented as follows:

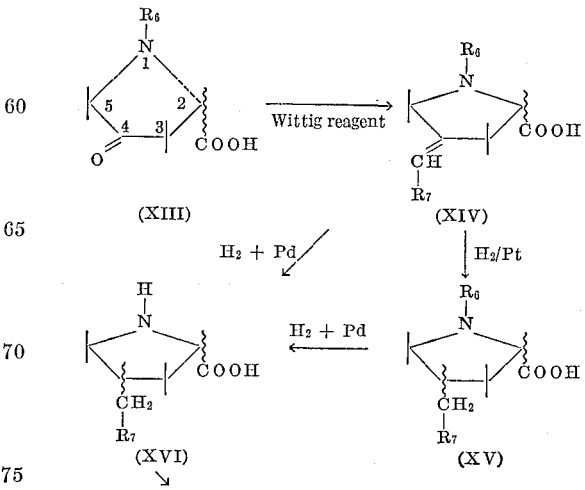

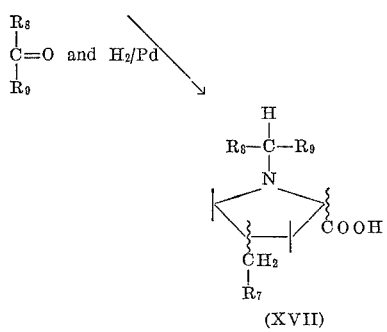

(XVII)

wherein $R_6$ is a protective hydrocarbyloxycarbonyl group which is removable by hydrogenolysis and wherein $R_7$ is selected from the group consisting of hydrogen and alkyl, in which the alkyl group contains from 1 to 11 carbon atoms, inclusive, and wherein $R_8$ and $R_9$ are selected from the group consisting of hydrogen and alkyl in which the alkyl groups contain together up to and including 11 carbon atoms.

The starting material (XIII) can be a 4-keto-L- or D-proline expressed by connecting the carboxyl group to the $C_2$ carbon atom by wavy lines in the formulae.

The protective hydrocarbyloxycarbonyl groups, $R_6$, which are removable by hydrogenolysis, include particularly benzyloxycarbonyl groups of the formula

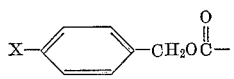

wherein X is selected from the group consisting of hydrogen, nitro, methoxy, chloro and bromo. Examples of such groups are carbobenzoxy, p-nitrocarbobenzoxy, p-bromo- and p-chlorocarbobenzoxy; also phenyloxycarbonyl groups of the formula

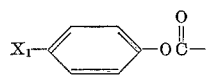

wherein $X_1$ is selected from the group consisting of hydrogen and alkyl containing from 1 to 4 carbon atoms, inclusive, such as phenyloxycarbonyl, p-tolyloxycarbonyl and p-ethylphenyloxycarbonyl; and allyloxycarbonyl and the like.

In addition, other substituents which are not hydrocarbyloxycarbonyl groups can be utilized as protective groups and removed by catalytic hydrogenolysis, e.g. triphenylmethyl, benzyl and p-nitrobenzyl.

This process comprises: treating a 1-hydrocarbyloxycarbonyl-4-ketaproline (XIII) with a Wittig reagent, usually an alkylidenetriphenylphosphorane [see, e.g., Wittig et al., Ber., 87, 1348 (1954); Trippett, Quarterly Reviews, XVIII, No. 4, p. 406 (1963)], to obtain the corresponding 4-alkylidene-1-hydrocarbyloxycarbonylproline (XIV); hydrogenating the proline (XIV) in the presence of a platinum catalyst to obtain the corresponding 4 - alkyl-1 - hydrocarbyloxycarbonylproline (XV); hydrogenating compound (XV) in the presence of a palladium catalyst to give the corresponding 4-alkylproline (XVI); treating compound (XVI) with a carbonyl compound $R_8COR_9$ defined as above, and hydrogenating in the presence of a palladium catalyst to obtain the corresponding 1,4-dialkylproline (XVII).

Alternatively, the 4-alkylidene-1-hydrocarbyloxycarbonylproline (XIV) can be hydrogenated in the presence of a palladium catalyst to give directly the 4-alkylproline of Formula XVI.

Hydrogenation of XIV in the presence of a platinum catalyst gives significant amounts of both cis and trans isomers of structure XV. Hydrogenation of XIV in the presence of palladium, however, gives final products which are mostly the cis isomer with mere traces of the trans isomer. In either method the final products can be obtained in pure form by conversion of the resulting 1,4-dialkylprolines (XVIII) to their amides, separating the amides chromatographically and hydrolyzing the separated amides to obtain the pure prolines.

PREPARATION 5

*4-methylene-1-carbobenzoxy-L-proline*

Sodamide was prepared in the usual manner from 1.29 g. (56 mmoles) of sodium in 170 ml. of liquid ammonia. 20 g. (56 mmoles) of methyltriphenylphosphonium bromide was added, the mixture was stirred at room temperature (24–26° C.) for 1 hour, and the ammonia was evaporated.

To the residue was added 150 ml. of a mixture of equal amounts of ether and tetrahydrofuran. The mixture was heated at reflux for a period of 5–7 minutes, cooled to 26° C. and thereto was added 2.63 g. (10 mmoles) of 4-keto-1-carbobenzoxy-L-proline [Patchett et al., J. Am. Chem. Soc., 79, 185 (1957)], in 20 ml. of tetrahydrofuran. After heating the reaction mixture under reflux for 2.5 hours, the mixture was cooled, diluted with ether and aqueous sodium bicarbonate solution and filtered; the ether was discarded. The filtrate was acidified, extracted with ether and the extracts were evaporated to give 2.2 g. of crude 4-methylene-1-carbobenzoxy-L-proline.

The crude material (2.2 g.) was dissolved in ether and 1.8 ml. of dicyclohexylamine was added; 3.25 g. (74.4% yield) of 4-methylene-1-carbobenzoxy-L-proline dicyclohexylamine salt crystallized rapidly. The crystals after drying melted at 154–158° C.; rotation $[\alpha]_D$ plus 0.56° (c. .795, chloroform).

PREPARATION 6

*Cis-4-methyl-L-proline*

A suspension of 20.9 g. of 4-methylene-1-carbobenzoxy-L-proline dicyclohexylamine salt in 308 ml. of 5% aqueous sodium hydroxide and 308 ml. of ether was shaken until all of the solid had dissolved. The layers were separated and each was back-washed with fresh solvent. The aqueous solutions were combined, acidified with dilute acid and extracted with ether. Evaporation of the solvent gave 4-methylene-1-carbobenzoxy-L-proline; yield, 12.1 g. (97.5%). This acid was dissolved in 250 ml. of methanol and hydrogenated over 2 g. of 10% palladium-on-charcoal catalyst under 40 lbs. pressure of hydrogen for 2.5 hours. Filtration and evaporation of the reaction mixture gave cis-4-methyl-L-proline which was crystallized from methanol-ether; it melted at 231–233° C.

Further recrystallization from acetonitrile gave pure cis-4-methyl-L-proline melting at 238–240° C.

*Analysis.*—Calcd. for $C_6H_{11}NO_2$: C, 55.79; H, 8.59; N, 10.85. Found: C, 55.39; H, 8.42; N, 10.78.

PREPARATION 7

*Cis-4-methyl-L-hygric acid and the hydrochloric acid salt thereof*

6 ml. of formalin and 1 g. of palladuim-on-charcoal catalyst (10% palladium) were added to the hydrogenated reaction mixture obtained in Preparation 6 and hydrogenation was continued for 2 hours. Thereafter the mixture was filtered to remove the catalyst and the solvent was removed by distillation. The resulting oily residue of 7.4 g., chiefly cis-4-methyl-L-hygric acid, did not crystallize. It was dissolved in methanol and ether saturated with hydrogen chloride. Crystalline cis-4-methyl-L-hygric acid hydrochloride precipitated, which was recovered by filtration and dried. The dried material had a melting point of 206 to 215° C. and after several recrystallizations from methanol and ether cis-4-methyl-L-hygric acid·HCl of melting point 213–216° C. was obtained.

*Analysis.*—Calcd. for $C_7H_{14}ClNO_2$: C, 46.80; H, 7.85; N, 7.80. Found: C, 47.54; H, 7.81; N. 8.00.

PREPARATION 8

*4-propylidene-1-carbobenzoxy-L-proline and dicyclohexylamine salt*

Sodium hydride (3.8 g.) was warmed with 75 ml. of dimethylsulfoxide at a temperature of 70–75° C. until the reaction was complete. After cooling to 20° C., 30.8 g. of propyltriphenylphosphonium bromide was added, and the resulting solution was stirred for 30 minutes to insure complete reaction. A solution of 5.2 g. of 4-keto-1-carbobenzoxyl-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassuim bicarbonate and 100 ml. of water added, and filtered. The filtrate was washed twice with 150 ml. portions of ether and the ether was discarded after back-extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, an analytical sample was obtained which melted at 164–166° C. and had a rotation of $[\alpha]_D$ minus 8° (c.=0.3898 g./100 ml., $CHCl_3$).

*Analysis.*—Calcd. for $C_{28}H_{42}N_2O_4$: C, 71.45; H, 9.00; N, 5.95. Found: C, 71.77; H, 9.39; N, 5.1.

PREPARATION 9

*Cis-4-propyl-L-proline*

8 g. (17 mmoles) of the dicyclohexylamine salt of 4-propylidene-1-carbobenzoxy-L-proline was shaken with excess 1.5 N sodium hydroxide solution and ether until solution was complete. The layers were separated and each one was backwashed. The aqueous alkaline layer was combined with the backwash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil. This oil was hydrogenated in 200 ml. of methanol over 1 g. of 10% palladium-on-charcoal catalyst for a period of 2 hours. Since the reaction appeared incomplete from thin-layer chromatographic analysis, hydrogenation was continued for 2 hours after 0.5 g. of fresh catalyst had been added. The mixture was thereupon filtered and the filtrate was evaporated to a residue which was crystallized from methanol-ether: melting point about 222° C. with decomposition. This product consisted of cis-4-propyl-L-proline with a trace of trans-4-propyl-L-proline.

PREPARATION 10

*Cis-4-propyl-L-hygric acid*

To the hydrogenation mixture from a hydrogenation conducted as in Preparation 9 was added 5 ml. of Formalin. The mixture was hydrogenated for 2.5 hours at 45 lbs. pressure of hydrogen in the presence of an additional ½ g. of 10% palladium-on-carbon catalyst. The mixture was cooled, filtered and the filtrate was evaporated to dryness. The residue was dissolved in methanol, converted to the hydrochloride by treatment of the methanol solution with an ether-hydrogen chloride solution and crystallized from methanol-ether to give 2.82 g. (80%) of cis-4-propyl-L-hygric acid hydrochloride of melting point 201–206° C.; rotation $[a]_D$ minus 60° (c.=0.8344, $H_2O$).

*Analysis.*—Calcd. for $C_9H_{17}NO_2 \cdot HCl$: C, 52.04; H, 8.73; N, 6.75. Found: C, 51.72; H, 8.96; N, 6.44.

This sample contained less than 2% of trans-4-propyl-L-hygric acid.

Treating cis-4-propyl-L-hygric acid hydrochloride in aqueous solution with silver oxide, removing the thus-formed silver chloride and excess silver oxide by filtration and evaporating the filtrate gave cis-4-propyl-L-hygric acid in the zwitterion form.

PREPARATION 10a

*1-ethyl-cis-4-propyl-L-proline*

In the manner given in Preparation 10, 5 ml. of acetaldehyde was added to a hydrogenation mixture from a hydrogenation as conducted in Preparation 9, and hydrogenation was continued in the presence of a palladium-on-charcoal catalyst to give 1-ethyl-cis-4-propyl-L-proline.

PREPARATION 10b

*1-propyl-cis-4-propyl-L-proline*

In the manner given in Preparation 10, 5 ml. of propionaldehyde was added to a hydrogenation mixture from a hydrogenation as conducted in Preparation 9, and hydrogenation was continued in the presence of a palladium-on-charcoal catalyst to give 1-propyl-cis-4-propyl-L-proline.

PREPARATION 10c

*1-butyl-cis-4-propyl-L-proline*

In the manner given in Preparation 10, 5 ml. of butyraldehyde was added to a hydrogenation mixture from a hydrogenation as conducted in Preparation 9, and hydrogenation was continued in the presence of a palladium-on-charcoal catalyst to give 1-butyl-cis-4-propyl-L-proline.

PREPARATION 10d

*1-(1-pentylhexyl)-cis-4-propyl-L-proline*

In the manner given in Preparation 10, 5 ml. of dipentyl ketone was added to a hydrogenation mixture from a hydrogenation as conducted in Preparation 9, and hydrogenation was continued in the presence of a palladium-on-charcoal catalyst to give 1-(1-pentylhexyl)-cis-4-propyl-L-proline.

PREPARATION 11

*Cis-4-propyl-L-hygramide and trans-4-propyl-L-hygramide*

A mixture of 3.09 g. (15 mmoles) of cis-4-propyl-L-hygric acid containing a small quantity of trans-4-propyl-L-hygric acid, 9.5 ml. of tributylamine, 100 ml. of acetonitrile and 40 ml. of acetone was stirred until complete solution had taken place. To this solution, cooled to 10° C., was added 2.05 ml. of isobutyl chloroformate. The reaction mixture was stirred for 30 minutes in the ice bath after which time 15 ml. of ammonium hydroxide was added and stirring was continued for 2 hours at room temperature. The mixture was distilled in vacuo until a residue was obtained, which was acidified with hydrochloric acid and extracted with ether. The ether extracts were discarded. The acidified aqueous fraction was made alkaline with soduim hydroxide and extracted with methylene chloride. The methylene chloride extract was chromatographed over silica gel (500 g.) using aqueous 80% acetone as the eluant and taking 15 ml. fractions. The fractions consisting of almost pure cis-4-propyl-L-hygramide as shown by thin-layer chromatography and fractions of a mixture of cis-4-propyl-L-hygramide together with trans-4-propyl-L-hygramide were obtained. The latter fractions were rechromatographed to yield a small amount of fairly pure trans-4-propyl-L-hygramide and a larger amount of mixtures of trans-4-propyl-L-hygramide and cis-4-propyl-L-hygramide. The mixtures were again rechromatographed and the fractions containing almost pure trans-4-propyl-L-hygramide were combined with the prior fraction containing the almost pure trans isomer. These fractions were thereupon recrystallized from Skellysolve B to give 10 mg. of trans-4-propyl-L-hygramide, about 85% pure on the basis of thin-layer chromatography; rotation $[\alpha]_D^{25}$ minus 91° (c., 0.833, $H_2O$).

The fractions containing the almost pure cis-4-propyl-L-hygramide were recrystallized from ethyl acetate-Skellysolve B to give pure cis-4-propyl-L-hygramide of melting point 113.5–115.5° C. and rotation $[\alpha]_D$ minus 89° (c., 0.841, $H_2O$).

*Analysis.*—Calcd. for $C_9H_{18}NO_2$: C, 63.49; H, 10.66; N, 16.46. Found: C, 63.41; H, 10.76; N, 16.28.

PREPARATION 12

*Cis-4-propyl-L-hygric acid hydrochloride from cis-4-propyl-L-hygramide*

Cis-4-propyl-L-hygramide (400 mg.) was heated with 22 ml. of 20% hydrochloric acid under reflux for a period of 4 hours. The reaction mixture was then cooled, evaporated to dryness in vacuo, and the residue was slurried with a small amount of warm ethanol and filtered to remove ammonium chloride. Ether was added to the filtrate and after cooling a white solid separated. After four recrystallizations from ethanol, cis-4-propyl-L-hygric acid hydrochloride was obtained which, as in Preparation 10, could be converted to cis-4-propyl-L-hygric acid by treatment with silver oxide.

PREPARATION 13

*Trans-4-propyl-L-hygric acid hydrochloride*

In the manner given in Preparation 12, trans-4-propyl-L-hygramide was hydrolyzed with hydrochloric acid to give trans-4-propyl-L-hygric acid hydrochloride.

PREPARATION 14

*Cis-4-propyl-L-hygric acid and trans-4-propyl-L-hygric acid*

5 g. of 4-propylidene-1-carbobenzoxy-L-proline in 200 ml. of methanol was hydrogenated over 1 g. of a 7% platinum-on-Dowex 1 catalyst (40 lbs. $H_2$, for 3 hours). (Dowex 1 is a strongly basic anion exchange resin produced by copolymerization of substituted styrenes and divinylbenzene.) After three hours of hydrogenation, 5 ml. of Formalin and 1 g. of 10% palladium-on-charcoal catalyst was added and the hydrogenation was continued for 2½ hours at 45 lbs. pressure. The catalysts were then removed by filtration and the solvent was removed by distillation. The residue was dissolved in methanol, converted to the hydrochloride as in Preparation 10, and several times recrystallized from methanol-ether to give a mixture of the hydrochlorides of cis-4-propyl-L-hygric acid and trans-4-propyl-L-hygric acid, the latter in about 30% yield.

In the manner shown in Preparation 11, this mixture was separated by converting the hygric acids into the amides and treating, as shown in Preparation 12, the separated amides to obtain pure cis-4-propyl-L-hygric acid and pure trans-4-propyl-L-hygric acid.

In the manner given in Preparation 14, other 1,4-dialkyl-L-prolines can be produced, such as trans-4-methyl-L-hygric acid,
trans-4-ethyl-L-hygric acid,
trans-4-butyl-L-hygric acid,
trans-4-pentyl-L-hygric acid,
trans-4-heptyl-L-hygric acid,
trans-4-octyl-L-hygric acid,
trans-4-decyl-L-hygric acid,
trans-4-dodecyl-L-hygric acid,
trans-4-ethyl-1-propyl-L-proline,
trans-4-octyl-1-ethyl-L-proline,
trans-4-hexyl-1-dodecyl-L-proline,
trans-4-undecyl-1-(1-butylhexyl)-L-proline,
cis-4-propyl-1-methyl-L-proline,
cis-4-heptyl-1-decyl-L-proline,
cis-4-butyl-1-ethyl-L-proline,
cis-4-butyl-1-propyl-L-proline,
cis-4-pentyl-1-propyl-L-proline,
cis-4-hexyl-L-hygric acid,
cis-4-hexyl-1-butyl-L-proline,
cis-4-heptyl-1-pentyl-L-proline,
cis-4-decyl-1-(1-butylpentyl)-L-proline,
cis-4-dodecyl-1-(1-pentylheptyl)-L-proline,
and the like.

The methods of this invention are furthermore applicable for the preparation of the 1,4-dialkyl-D-prolines using as starting material 4-keto-D-proline and protecting the proline nitrogen by a protective hydrocarbyloxycarbonyl group as shown for the L-prolines in Formula XIII. Representative 1,4-dialkyl-D-prolines thus produced include: trans-4-propyl-D-hygric acid, cis-4-propyl-D-hygric acid, trans-4-butyl-1-ethyl-D-proline, trans - 4-hexyl-1-propyl-D-proline, trans-4-decyl-1-pentyl-D-proline, cis-4-hexyl-1-octyl-D-proline, and the like.

(3) *The condensation of the amino sugar fraction with a 1,4-dialkylproline*

The condensation of the amino sugar with a selected 1,4-dialkylproline is generally carried out by reacting the 1,4-dialkylproline, dissolved in acetonitrile containing a trialkylamine, with isobutyl chloroformate and subsequently with the amino sugar. The details of this reaction are illustrated in the following preparations:

PREPARATION 15

*Methyl N-(cis-4-hexyl-L-hygroyl)-α-thiolincosaminide*

A mixture of 2.47 g. (12 mmoles) of cis-4-hexyl-L-hygric acid hydrochloride and 7.6 ml. (16 mmoles) of tributylamine in 80 ml. of distilled acetonitrile was stirred until all of the solid had dissolved. The solution was cooled in an ice bath and 1.54 g. (12 mmoles) of isobutyl chloroformate was slowly added. After 1 hour a solution of 3 g. of methyl thiolincosaminide (12 mmoles) in 60 ml. of water was added. The reaction mixture was stirred for 1 hour in an ice bath and then 3 hours at 26° C. The acetonitrile was removed in vacuo and the residue thus obtained was diluted with 20 ml. of water and twice extracted with ether. The aqueous solution was lyophilized. The residue was dissolved in methanol, chloroform was added, and the solution was washed twice with water. The aqueous washings from above were lyophilized and dried at 50° C. under vacuum. The residue was leached several times with chloroform and the chloroform solution was chromatographed over 200 g. of Florisil, a synthetic magnesium silicate, collecting fractions of 375 ml. and using a gradient elution system composed of 4 l. of Skellysolve B hexanes with 20% ethyl acetate in Reservoir A and a solution of 20% methanol diluted to 4 l. with Skellysolve B hexanes-20% ethyl acetate in Reservoir B. The fractions which showed material in the lincomycin area by thin-layer chromatography were combined and evaporated to give a residue. This residue was dissolved in dilute hydrochloric acid. Adding acetone to the solution precipitated crude methyl N-(cis-4-hexyl-L-hygroyl)-α-thiolincosaminide hydrochloride (XIX) having the following formula:

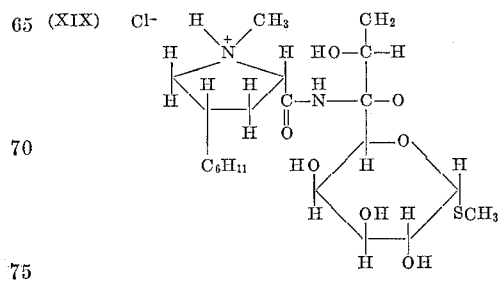

Two g. of methyl N-(cis-4-hexyl-L-hygroyl)-α-thiolincosaminide hydrochloride, dissolved in 100 ml. of water, was treated with 2 g. of silver carbonate. The mixture was then extracted three times with butanol. The combined extracts were distilled in vacuo to give a residue which was dissolved in ethanol. The solution was treated with 1 g. of activated charcoal, and filtered. The filtrate was evaporated to dryness and the residue was crystallized and twice recrystallized from ethanol to give methyl N-(cis-4-hexyl-L-hygroyl)-α-thiolincosaminide.

PREPARATION 16

*Methyl N - (trans - 4 - butyl - 1 - methyl - L - prolyl) - α-thiolincosaminide and the hydrochloride thereof*

To a solution of 6.3 g. of trans-4-butyl-1-methyl-L-proline in 175 ml. of distilled acetonitrile cooled to 0° there was added 3.46 ml. of triethylamine followed by 3.34 ml. of isobutylchloroformate. The mixture was stirred at 0° C. (±3°) for 15 min. A solution of 6.2 g. of methyl α-thiolincosaminide in 85 ml. of water was added, and the reaction mixture was stirred at 0° C. for 0.5 hr. and 25° C. for 1 hour. The reaction product was then filtered and dried yielding methyl N-(trans-4-butyl-1-methyl-L-prolyl)-α-thiolincosaminide. The thus-obtained product was treated with sufficient dilute hydrochloric acid to dissolve it and the thus-obtained hydrochloride was precipitated by the addition of acetone. Repricipitation with acetone gave the hydrochloride of methyl N-(trans-4-butyl-1-methyl-L-prolyl)-α-thiolincosaminide melting at 139–141° C.

PREPARATION 17

*Methyl N - (cis - 4 - butyl - 1 - methyl - L - prolyl) - α-thiolincosaminide and its hydrochloride*

In the manner given in Preparation 16, the corresponding cis-epimer, methyl N-(cis-4-butyl-1-methyl-L-prolyl)-α-thiolincosaminide hydrochloride was prepared, in a crystalline, solvated (4.95% water) form having a softening point of 108° C. and melting at about 189° C.

In the manner given in Preparation 16, other starting materials are prepared by reacting selected 1,4-dialkyl-prolines dissolved in acetonitrile with triethylamine, followed by isobutyl chloroformate and then with methyl or ethyl α-thiolincosaminide or 2-(hydroxyethyl)-7-methoxy-α-thiolincosaminide. Representative starting materials prepared and obtained as hydrochlorides include:

the hydrochlorides of methyl N-(trans-1,4-dimethyl-L-prolyl)-α-thiolincosaminide,
methyl N-(trans-4-ethyl-1-methyl-L-prolyl)-α-thiolincosaminide,
methyl N-(trans-4-propyl-1-butyl-L-prolyl)-α-thiolincosaminide,
methyl N-(trans-4-octyl-1-ethyl-L-prolyl)-α-thiolincosaminide,
methyl N-(trans-4-decyl-1-butyl-L-prolyl)-α-thiolincosaminide,
methyl N-(trans-4-undecyl-1-hexyl-L-prolyl)-α-thiolincosaminide,
methyl N-(trans-4-dodecyl-1-isopropyl-L-prolyl)-α-thiolincosaminide,
methyl N-(cis-4-methyl-1-octyl-L-prolyl)-α-thiolincosaminide,
methyl N-(cis-4-propyl-1-ethyl-L-prolyl)-α-thiolincosaminide,
methyl N-(cis-4-hexyl-1-dodecyl-L-prolyl)-α-thiolincosaminide,
methyl N-(cis-4-pentyl-1-nonyl-L-prolyl)-α-thiolincosaminide,
methyl N-(cis-4-ethyl-1-undecyl-L-prolyl)-α-thiolincosaminide,
methyl N-(trans-4-pentyl-1-decyl-D-prolyl)-α-thiolincosaminide,
methyl N-(trans-4-propyl-1-methyl-D-prolyl)-α-thiolincosaminide,
methyl N-(trans-4-ethyl-1-propyl-D-prolyl)-α-thiolincosaminide,
methyl N-(trans-4-hexyl-1-dodecyl-D-prolyl)-α-thiolincosaminide,
methyl N-(cis-4-methyl-1-octyl-D-prolyl)-α-thiolincosaminide,
methyl N-(cis-4-octyl-1-methyl-D-prolyl)-α-thiolincosaminide,
methyl N-(cis-4-decyl-1-ethyl-D-prolyl)-α-thiolincosaminide,
ethyl N-(trans-4-ethyl-1-methyl-L-prolyl)-α-thiolincosaminide,
ethyl N-(trans-4-propyl-1-methyl-L-prolyl)-α-thiolincosaminide,
ethyl N-(trans-4-butyl-1-ethyl-L-prolyl)-α-thiolincosaminide,
ethyl N-(trans-4-hexyl-1-octyl-L-prolyl)-α-thiolincosaminide,
ethyl N-(trans-4-dodecyl-1-methyl-L-prolyl)-α-thiolincosaminide,
ethyl N-(cis-4-methyl-1-methyl-L-prolyl)-α-thiolincosaminide,
ethyl N-(cis-4-propyl-1-ethyl-L-prolyl)-α-thiolincosaminide,
ethyl N-(cis-4-butyl-1-methyl-L-prolyl)-α-thiolincosaminide,
ethyl N-(cis-4-pentyl-1-ethyl-L-prolyl)-α-thiolincosaminide,
ethyl N-(cis-4-hexyl-1-propyl-L-prolyl)-α-thiolincosaminide,
ethyl N-(cis-4-heptyl-1-propyl-L-prolyl)-α-thiolincosaminide,
ethyl N-(cis-4-octyl-1-propyl-L-prolyl)-α-thiolincosaminide,
ethyl N-(cis-4-dodecyl-1-hexyl-L-prolyl)-α-thiolincosaminide,
ethyl N-(cis-4-dodecyl-1-methyl-D-prolyl)-α-thiolincosaminide,
ethyl N-(cis-4-methyl-1-decyl-D-prolyl)-α-thiolincosaminide,
ethyl N-(cis-4-propyl-1-octyl-D-prolyl)-α-thiolincosaminide,
ethyl N-(cis-4-octyl-1-propyl-D-prolyl)-α-thiolincosaminide,
ethyl N-(cis-4-butyl-1-hexyl-D-prolyl)-α-thiolincosaminide,
ethyl N-(cis-4-nonyl-1-heptyl-D-prolyl)-α-thiolincosaminide,
ethyl N-(trans-4-methyl-1-ethyl-D-prolyl)-α-thiolincosaminide,
ethyl N-(trans-4-ethyl-1-methyl-D-prolyl)-α-thiolincosaminide,
ethyl N-(trans-4-propyl-1-decyl-D-prolyl)-α-thiolincosaminide,
ethyl N-(trans-4-butyl-1-nonyl-D-prolyl)-α-thiolincosaminide,
ethyl N-(trans-4-hexyl-1-octyl-D-prolyl)-α-thiolincosaminide,
ethyl N-(trans-4-decyl-1-dodecyl-D-prolyl)-α-thiolincosaminide,
ethyl N-(trans-4-dodecyl-1-undecyl-D-prolyl)-α-thiolincosaminide,
2-hydroxyethyl N-(trans-4-propyl-1-ethyl-L-prolyl)-α-thiocelestosaminide,
2-hydroxyethyl N-(trans-4-butyl-1-ethyl-L-prolyl)-α-thiocelestosaminide,
2-hydroxyethyl N-(trans-4-pentyl-1-methyl-L-prolyl)-α-thiocelestosaminide, 2-hydroxyethyl N-(trans-4-hexyl-1-propyl-L-prolyl)-α-celestosaminide, 2-hydroxyethyl N-(trans-4-octyl-1-decyl-L-prolyl)-α-thiocelestosaminide, 2-hydroxyethyl N-(trans-4-decyl-1-methyl-L-prolyl)-α-thiocelestosaminide, 2-hydroxyethyl N-(trans-4-dodecyl-1-ethyl-L-prolyl)-α-thiocelestosaminide, 2-hydroxyethyl N-(cis-4-methyl-1-ethyl-L-prolyl)-α-thiocelestosaminide, 2-hydroxyethyl N-(cis-4-ethyl-1-methyl-L-prolyl)-α-thiocelestosaminide, 2-hydroxyethyl N-(cis-4-propyl-1-methyl-L-prolyl)-α-thiocelestosaminide, 2-hydroxyethyl N-(cis-4-butyl-1-methyl-L-prolyl)-α-thiocelestosaminide, 2-hydroxyethyl N-(cis-4-hexyl-1-dodecyl-L-prolyl)-α-thiocelestosaminide, 2-hydroxyethyl N-(cis-4-octyl-1-butyl-L-prolyl)-α-thiocelestosaminide, 2-hydroxyethyl N-(trans-4-propyl-1-ethyl-D-prolyl)-α-thiocelestosaminide, 2-hydroxyethyl N-(trans-4-propyl-1-methyl-D-prolyl)-α-thiocelestosaminide, 2-hydroxyethyl N-(trans-4-hexyl-1-octyl-D-prolyl)-α-thiocelestosaminide, 2-hydroxyethyl N-(trans-4-heptyl-1-hexyl-D-prolyl)-α-thiocelestosaminide, 2-hydroxyethyl N-(trans-4-decyl-1-nonyl-D-prolyl)-α-thiocelestosaminide, 2-hydroxyethyl N-(trans-4-undecyl-1-propyl-D-prolyl)-α-thiocelestosaminide, 2-hydroxyethyl N-(trans-4-dodecyl-1-ethyl-D-prolyl)-α-thiocelestosaminide, 2-hydroxyethyl N-(cis-4-propyl-1-methyl-D-prolyl)-α-thiocelestosaminide, 2-hydroxyethyl N-(cis-4-butyl-1-methyl-D-prolyl)-α-thiocelestosaminide, 2-hydroxyethyl N-(cis-4-pentyl-1-ethyl-D-prolyl)-α-thiocelestosaminide, 2-hydroxyethyl N-(cis-4-hexyl-1-undecyl-D-prolyl)-α-thiocelestosaminide, 2-hydroxyethyl N-(cis-4-heptyl-1-dodecyl-D-prolyl)-α-thiocelestosaminide, 2-hydroxyethyl N-(cis-4-decyl-1-methyl-D-prolyl)-α-thiocelestosaminide, 2-hydroxyethyl N-(cis-4-dodecyl-1-ethyl-D-prolyl)-α-thiocelestosaminide, and the like.

In carrying out the process of the present invention, the selected starting materials of Formula I, preferably, but not necessarily as the hydrochlorides, were reacted with an excess of concentrated hydrochloric acid and an excess of an alkanethiol such as methanethiol, ethanethiol, propanethiol, butanethiol, pentanethiol, hexanethiol, heptanethiol, octanethiol, nonanethiol, decanethiol, undecanethiol, dodecanethiol, 2-propanethiol, 2-butanethiol, and the like. In the preferred embodiment of this invention the starting material is added to a cooled solution of the alkanethiol containing a large amount of hydrochloric acid. The quantity of the thiol is at least 1 mole per mole of starting material. However, an excess of 10 to 50 moles per 1 mole of starting material is preferred. Similarly, the hydrochloric acid is added in a 10 to 50 times molar excess per mole of starting material. Temperatures between 0 to —5° C. and to 10 to 15° C. above are used to carry out the reaction. The reaction time may vary between ½ and 2 hours. At the termination of the reaction the material is recovered by conventional procedures, generally by extraction with an aqueous immiscible organic solvent, such as pentane, hexane, benzene, toluene, methylene dichloride, chloroform, or the like, after the hydrochloric solution has been neutralized or nearly neutralized by the addition of aqueous alkali, such as aqueous potassium or sodium hydroxide. Instead of alkanethiol benzyl and thenyl mercaptans can be used.

The thus-obtained mercaptals of Formula II are frequently present in mixtures consisting of (1) mercaptals in which $R_1=R_2$ and is identical with the organic radical, alkyl, benzyl or thenyl, of the mercaptan used in the above reaction, and (2) mercaptal in which one of the $R_1$ or $R_2$ groups is identical with $R_3$ and the other is identical with the organic radical of the mercaptan. The mixtures can be separated as shown in the examples.

The 1,6,8-trideoxy-6-(1,4-dialkyl-2 - pyrrolidinecarboxamido)-D-erythro-D-galacto-octitols of Formula III are obtained from the compounds of Formula II by heating the mercaptal compounds dissolved in a lower alkanol such as methanol, ethanol, 1-propanol, 2-propanol, 1-butanol, or the like with commercially available Raney nickel. The reaction is generally carried out with a large amount of nickel catalyst; preferably the amount is from 10 to 40 times the weight of the selected dimethyl mercaptal (II). In the preferred embodiment of the reaction, the reaction mixture is refluxed for several hours (from 1 to 24 hours), preferably between 4 to 12 hours. At temperatures lower than the reflux temperature, the reaction time is, of course, increased. The product is isolated by filtering the reaction mixture to remove the nickel catalyst, and evaporating the filtrate. Purification of the compound of Formula III can be achieved by conventional means such as recrystallization of the residue obtained after the filtrate was evaporated.

An N-(1,4-dialkylpropyl)-1-alkylthio-1 - deoxylincosaminol of Formula VI can be obtained by using a limited amount of Raney nickel, a reaction time of not more than 3 to 5 hours, and a rather substantial amount of absolute ethanol, such as 30 to 50 times the weight of the dialkyl mercaptal. Even in this case compounds of Formula III are obtained from which the compound of Formula VI can be separated by chromatography or countercurrent distribution methods.

The 1,6,8-trideoxy-octitol of Formula IV is prepared from compound III by heating compound III with excess of hydrazine hydrate. The hydrazine hydrate is generally used in an excess of between 10 and 50 parts by weight of hydrazine hydrate to 1 part of the N-(1,4-dialkylprolyl)-1-deoxylincosaminol of Formula III. The time of reaction is usually several days, being in the preferred embodiment of this invention between 2 and 8 days, at the reflux temperature of the reaction mixture. The desired product of Formula IV is isolated from the reaction mixture by conventional procedures, such as by evaporation of the hydrazine hydrate at reduced pressure and recrystallization of the obtained residue from a convenient solvent such as acetonitrile, ethanol, isopropanol, or the like.

The 6-amino-1,6,8-trideoxy-D-erythro-D-galacto-octitol (IV), in which the 7-hydroxyl group can be etherified, can be acylated in conventional manner with an acid anhydride or an acid chloride, particularly the acid anhydrides of hydrocarbon carboxylic acids containing from 2 to 12 carbon atoms, inclusive, such as the anhydrides of acetic acid, propionic acid, butyric acid, valeric acid, hexanoic acid, heptanoic acid, octanoic acid, nonanoic acid, decanoic acid, undecanoic acid, dodecanoic acid, toluic acid, benzoic acid, phenylacetic acid, phenylpropionic acid, cyclopentanepropionic acid, or also with a chloronitrophenyl benzoate which introduces the benzoyl group. When acid anhydrides are used, solvents such as methanol or absolute ethanol, dihexane, tetrahydrofuran, or the like may be used. If acid chlorides are used, the reaction can be carried out in an aqueous basic solution or in a non-aqueous solvent, such as triethylamine, pyridine, or the like. Acid anhydrides are generally preferred.

The following examples are illustrative of the process and products of the present invention, but are not to be construed as limiting.

EXAMPLE 1

*N-(trans-4-propyl-L-hygroyl)lincosamine dimethyl mercaptal (XX)*

(XX)

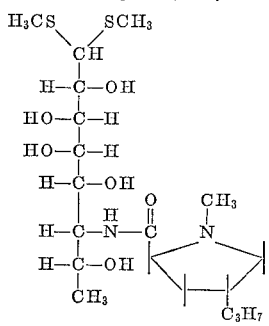

In a 1-liter, 3-necked flask equipped with a Dry Ice condenser, 150 ml. of concentrated hydrochloric acid and 50 ml. of methanethiol were chilled to 0° C. After rapid addition of 15 g. of lincomycin hydrochloride (U.S. Patent 3,086,912), the mixture was rapidly stirred for 5 hours, diluted with 1 volume of ice water and extracted with two 100-ml. portions of pentane. The extract was discarded. The 6 N hydrochloric acid solution was partially neutralized by addition of 100 g. of potassium hydroxide pellets at about 25° C. (Dry Ice-acetone cooling permitted rapid addition). The potassium chloride was removed by filtration. Chloroform (200 ml.) was added to the filtrate, which was then adjusted to pH 10 by the addition of 2 N aqueous sodium hydroxide solution and extracted with the chloroform. After a second extraction with chloroform, the chloroform extracts were combined and washed with three 50-ml. portions of water, thereby effecting an emulsion. The extracts, containing water, were evaporated in vacuo, thus transferring the desired product to the aqueous phase, which was then freeze dried. The freeze-dried product was crystallized from 75 ml. of boiling acetone to give 7.5 g. of product melting at 134–140° C. After a second crystallization from acetone, N-(trans-4-propyl-L-hygroyl)lincosamine dimethyl mercaptal was obtained; M.P. 146–148° C., optical rotation $[\alpha]_D^{25}$=minus 33° (c.=1%, methylene chloride).

*Analysis.*—Calcd. for $C_{19}H_{38}N_2O_6S_2$: C, 50.19; H, 8.42; N, 6.16; O, 21.12; S, 14.10. Found: C, 50.15; H, 8.20; N, 5.94; S, 14.31.

EXAMPLE 2

*N-(trans-4-propyl-L-hygroyl)lincosamine diethyl mercaptal*

In a 1-liter, 3-necked flask were placed concentrated hydrochloric acid (150 ml.) and 50 ml. of ethanethiol, previously cooled to 0°. To this mixture was added 15 g. of lincomycin hydrochloride. After stirring magnetically at room temperature for a period of 5 hours, the reaction mixture was diluted with an equal volume of ice water, and the solution was extracted 3 times with Skellysolve B hexanes. The Skellysolve B hexane extracts were discarded.

The majority of the acid was then neutralized by the careful addition of solid potassium hydroxide (about 100 g.) while keeping the temperature of the well-stirred reaction mixture between 20 and 30° by cooling in an acetone-Dry Ice mixture. The thus-formed solid potassium chloride was removed by filtration and the solid washed well with chloroform. The chloroform washings and additional chloroform were added to the filtrate (a total of about 150 ml.) and the mixture, while magnetically stirred, was adjusted to a pH of 10 by the addition of 2 N aqueous sodium hydroxide. The chloroform layer was separated and the aqueous layer extracted thoroughly with chloroform. The chloroform extracts were combined, washed twice with water, and dried over anhydrous sodium sulfate. The dry chloroform solution was evaporated at 30° in vacuo to give a semisolid residue which was recrystallized 3 times from acetone to give colorless flattened needles of melting point 130–132°. A total yield of 6.91 g., 42.4%, of N-(4-propyl-L-hygroyl)lincosamine diethyl mercaptal was obtained.

*Analysis.*—Calcd. for $C_{21}H_{42}N_2O_6S_2$: C, 52.25; H, 8.77; N, 5.81; S, 13.29%. Found: C, 52.38; H, 8.71; N, 5.93; S, 13.46%.

EXAMPLE 3

*N-(trans-4-propyl-L-hygroyl)lincosamine dibutyl mercaptal and N-(trans-4-propyl-L-hygroyl)lincosamine butyl methyl mercaptal*

To a slurried mixture of 167 ml. of concentrated hydrochloric acid and 100 g. of butyl mercaptan (1.1 mole, cooled to 0° C.) was added 17 g. (0.0384 mole) of lincomycin hydrochloride. After stirring vigorously for 5 hours at 10°, 160 ml. of ice water was added and the reaction mixture extracted 3 times with 200 ml. of Skellysolve B hexanes. The Skellysolve B hexane fractions were discarded. The aqueous phase was cooled and potassium hydroxide pellets added while keeping the temperature at 10–20°. The thus-obtained potassium chloride was removed by filtration. The filter cake of potassium chloride was washed twice, each with 200 ml. of chloroform, and the chloroform washings were added to the filtrate. The reaction mixture was now made basic to a pH of 10 by adding sufficient 2 N sodium hydroxide solution, about 110 ml. The chloroform layer was separated and the water layer extracted twice with 200 ml. of chloroform. The chloroform layer and chloroform extracts were combined, washed 3 times with 100-ml. portions of saturated sodium chloride solution. The chloroform phase was then filtered and evaporated in vacuo to give 11.5 g. of white solids. The white solids were dissolved at room temperature in a mixture of methanol (1 part) and 9 parts of chloroform by volume. This solution was chromatographed over 800 g. of silica gel, taking fractions of 50 ml. each. The first 800 ml. of a forerun was discarded and on the basis of thin-layer chromatography data the following fractions were combined:

Fractions 14–16, inclusive (A)
Fractions 19–23, inclusive (B)
Fractions 30–41, inclusive (C)

Each of these fractions upon evaporation of the solvent produced crystalline material as follows:

Fraction A gave N-(trans-4-propyl-L-hygroyl)lincosamine dibutyl mercaptal which was recrystallized from acetone to give pure N-(trans-4-propyl-L-hygroyl)lincosamine dibutyl mercaptal of melting point 110–112° C., rotation $[\alpha]_D$ minus 11° in chloroform, having the following analysis:

*Analysis.*—Calcd. for $C_{25}H_{50}N_2O_6S_2$: C, 55.73; H, 9.35; N, 5.20; S, 11.90. Found: C, 55.65; H, 9.78; N, 5.42; S, 12.06.

Fraction B consisted of the mixed mercaptal which was recrystallized from acetone to give pure N-(trans-4-propyl-L-hygroyl)lincosamine methyl butyl mercaptal of melting point 120–130°; $[\alpha]_D$ in chloroform minus 18°.

*Analysis.*—Calcd. for $C_{22}H_{44}N_2O_6S_2$: C, 53.19; H, 8.93; N, 5.64; S, 12.91. Found: C, 52.67; H, 8.01; N, 5.90; S, 12.87.

Fraction C consisted of dimethyl mercaptal, namely, N-(trans-4-propyl-L-hygroyl)lincosamine dimethyl mercaptal, identical with the material obtained in Example 1.

EXAMPLE 4

*N-(trans-4-propyl-L-hygroyl)lincosamine dihexyl mercaptal*

In the manner given in Example 1, lincomycin hydrochloride was reacted with a mixture of hexanethiol and

21 hydrochloric acid to give N-(trans-4-propyl-L-hygroyl)-lincosamine dihexyl mercaptal.

Example 5

*N-(trans-4-ethyl-L-hygroyl)lincosamine dioctadecyl mercaptal*

In the manner given in Example 1, methyl N-(trans-4-ethyl-L-hygroyl)-α-thiolincosaminide was reacted with octadecanethiol and concentrated hydrochloric acid to give N-(trans-4-ethyl-L-hygroyl)lincosamine dioctadecyl mercaptal.

Example 6

*N-(trans-4-decyl-1-butyl-L-prolyl)lincosamine dioctyl mercaptal*

In the manner given in Example 1, reacting methyl N-(trans-4-decyl-1-butyl-L-prolyl)-α-thiolincosaminide with octanethiol concentrated hydrochloric acid produces N-(trans-4-decyl-1-butyl-L-prolyl)lincosamine dioctyl mercaptal.

Example 7

*N-(trans-4-octyl-1-ethyl-L-prolyl)lincosamine didodecyl mercaptal*

In the manner given in Example 1, reacting methyl N-(trans-4-octyl-1-ethyl-L-prolyl)-α-thiolincosaminide with dodecanethiol and concentrated hydrochloric acid produced N-(trans-4-octyl-1-ethyl-L-prolyl)lincosamine didodecyl mercaptal.

Example 8

*N-(cis-4-propyl-1-ethyl-L-prolyl)lincosamine diheptyl mercaptal*

In the manner given in Example 1, reacting methyl N-(cis-4-propyl-1-ethyl-L-prolyl)-α-thiolincosaminide with heptanethiol and concentrated hydrochloric acid produces N-(cis-4-propyl-1-ethyl-L-prolyl)lincosamine diheptyl mercaptal.

Example 9

*N-(trans-4-pentyl-1-decyl-D-prolyl)lincosamine didecyl mercaptal*

In the manner given in Example 1, reacting methyl N-(trans-4-pentyl-1-decyl-D-prolyl)-α-thiolincosaminide with decanethiol and concentrated hydrochloric acid produces N-(trans-4-pentyl-1-decyl-D-prolyl)lincosamine didecyl mercaptal.

Example 10

*N-(cis-4-methyl-1-octyl-L-prolyl)lincosamine dipentyl mercaptal*

In the same manner given in Example 1, reacting methyl N-(cis-4-methyl-1-octyl-L-prolyl)-α-thiolincosaminide with pentanethiol and concentrated hydrochloric acid produces N-(cis-4-methyl-1-octyl-L-prolyl)lincosamine dipentyl mercaptal.

Example 11

*N-(cis-4-hexyl-1-dodecyl-L-prolyl)lincosamine dibutyl mercaptal*

In the manner given in Example 1, reacting methyl N-(cis-4-hexyl-1-dodecyl-L-prolyl)-α-thiolincosaminide with butanethiol and concentrated hydrochloric acid produces N-(cis-4-hexyl-1-dodecyl-L-prolyl)lincosamine dibutyl mercaptal.

Example 12

*N-(cis-4-methyl-1-octyl-D-prolyl)lincosamine ditetradecyl mercaptal*

In the manner given in Example 1, reacting methyl N-(cis-4-methyl-1-octyl-D-prolyl)-α-thiolincosaminide with tetradecanethiol and concentrated hydrochloric acid produces N-(cis-4-methyl-1-octyl-D-prolyl)lincosamine ditetradecyl mercaptal.

Example 13

*N-(trans-4-decyl-1-butyl-L-prolyl)lincosamine dioctyl mercaptal*

In the manner given in Example 1, reacting ethyl N-(trans-4-decyl-1-butyl-L-prolyl)-α-thiolincosaminide with octanethiol and concentrated hydrochloric acid produces N-(trans-4-decyl-1-butyl-L-prolyl)lincosamine dioctyl mercaptal.

Example 14

*N-(trans-4-octyl-1-ethyl-L-prolyl)lincosamine didodecyl mercaptal*

In the manner given in Example 1, reacting ethyl N-(trans-4-octyl-1-ethyl-L-prolyl)-α-thiolincosaminide with dodecanethiol and concentrated hydrochloric acid produces N-(trans-4-octyl-1-ethyl-L-prolyl)lincosamine didodecyl mercaptal.

Example 15

*N-(cis-4 hexyl-1-dodecyl-L-prolyl)lincosamine dibutyl mercaptal*

In the manner given in Example 1, reacting ethyl N-(cis-4-hexyl-1-dodecyl-L-prolyl)-α-thiolincosaminide with butanethiol and concentrated hydrochloric acid produces N-(cis-4-hexyl-1-dodecyl-L-prolyl)lincosamine dibutyl mercaptal.

Example 16

*N-(trans-4-propyl-1-methyl-L-prolyl)lincosamine dicotadecyl mercaptal*

In the manner given in Example 1, reacting ethyl N-(trans-4-propyl-1-methyl-L-prolyl)-α-thiolincosaminide with octadecanethiol and concentrated hydrochloric acid produces N-(trans-4-propyl-1-methyl-L-prolyl)lincosamine dioctadecyl mercaptal.

Example 17

*N-(trans-4-propyl-1-methyl-L-prolyl)celestosamine diundecyl mercaptal (XXII)*

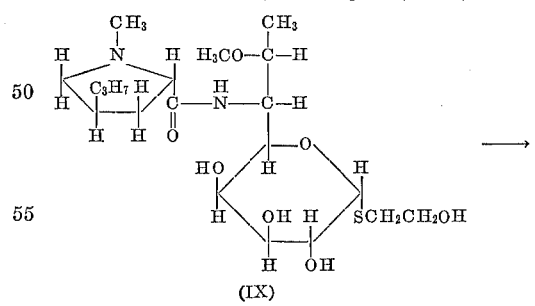

(IX)

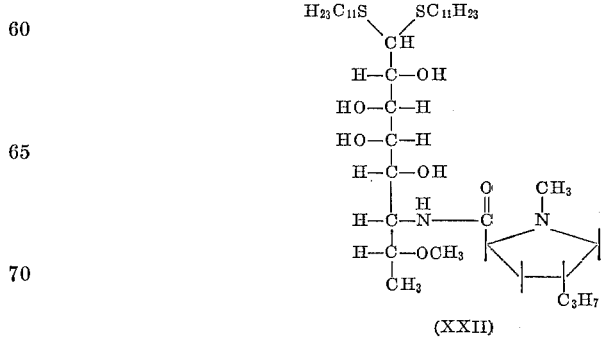

(XXII)

In the manner given in Example 1, reacting celesticetin [2-hydroxyethyl N-(trans-4-propyl-1-methyl-L-prolyl)-α- thiocelestosaminide (IX)] with undecanethiol and concentrated hydrochloric acid produces N-(trans-4-propyl-1 - methyl-L-prolyl)celestosamine diundecyl mercaptal (XXII).

EXAMPLE 18

*N-(cis-4-butyl-1-ethyl-D-prolyl)celestosamine dihexyl mercaptal*

In the manner given in Example 1, reacting 2-hydroxyethyl N-(cis-4-butyl-1 - ethyl-D-prolyl)-α-thiocelestosaminide with hexanethiol and concentrated hydrochloric acid produces N-(cis-4-butyl-1 - ethyl-D-prolyl)celestosamine dihexyl mercaptal.

EXAMPLE 19

*N-(cis-4-dodecyl-1-propyl-L-prolyl)celestosamine dihexadecyl mercaptal*

In the manner given in Example 1, reacting 2-hydroxyethyl N-(cis-4-dodecyl-1 - propyl-L-prolyl)-α-thiocelestosaminide with hexadecanethiol and concentrated hydrochloric acid produces N-(cis-4-dodecyl-1-propyl-L-prolyl)celestosamine dihexadecyl mercaptal.

EXAMPLE 20

*N-(trans-4-octyl-1-hexyl-D-prolyl)celestosamine dinonyl mercaptal*

In the manner given in Example 1, reacting 2-hydroxyethyl N-(trans-4-octyl-1 - hexyl-D-prolyl)-α-thiocelestosaminide with dinonanethiol and concentrated hydrochloric acid produces N-(trans-4-octyl-1 - hexyl-D-prolyl)celestosamine dinonyl mercaptal.

EXAMPLE 21

*N-(cis-4-propyl-D-hygroyl)lincosamine dihexyl mercaptal and N-(cis - 4 - propyl - D - hygroyl)lincosamine hexyl methyl mercaptal mixture*

In the manner given in Example 3, hexanethiol hydrochloric acid and methyl N-(cis-4-propyl-D-hygroyl)-α-thiolincosaminide were reacted to give a mixture of products, within was separated by chromatography into:

(A) N-(cis-4 - propyl-D-hygroyl)lincosamine dihexyl mercaptal,
(B) A mixture of two (diastomeric) N-(cis-4-propyl-D-hygroyl)lincosamine hexyl methyl mercaptals,
(C) A small fraction of N-(cis-4-propyl-D-hygroyl) lincosamine dimethyl mercaptal.

EXAMPLE 22

*N-(trans-4-decyl-1 - hexyl-L-prolyl)lincosamine dioctyl mercaptal and a mixture of two N-(trans-4-decyl-1-hexyl-L-prolyl)lincosamine octyl methyl mercaptals*

In the manner given in Example 3, octanethiol hydrochloric acid and methyl N-(trans-4-decyl - 1 - hexyl-L-prolyl)-α-thiolincosaminide were reacted to give a mixture of products which was separated by chromatography into:

(A) N-(trans-4-decyl-1 - hexyl-L-prolyl)lincosamine dioctyl mercaptal,
(B) A mixture of two N-(trans-4-decyl-1-hexyl-L-prolyl)lincosamine octyl methyl mercaptals,
(C) A small fraction of N-(trans-4-decyl-1 - hexyl-L-prolyl)lincosamine dimethyl mercaptal.

EXAMPLE 23

*N-(trans - 4 - dodecyl - 1 - pentyl-L-prolyl)lincosamine didodecyl mercaptal and a mixture of two N-(trans-4-dodecyl-1-pentyl-L-prolyl)lincosamine dodecyl methyl mercaptals*

In the manner given in Example 3, dodecanethiol, hydrochloric acid and methyl N-(trans-4-dodecyl-1-pentyl-L-prolyl)-α-thiolincosaminide were reacted to give a mixture of products which was separated by chromatography into:

(A) N-(trans-4-dodecyl-1 - pentyl-L-prolyl)lincosamine didodecyl mercaptal,
(B) A mixture of two N-(trans-4-dodecyl-1-pentyl-L-prolyl)lincosamine dodecyl methyl mercaptals,
(C) A small fraction of N-(trans-4-dodecyl-1-pentyl-L-prolyl)lincosamine dimethyl mercaptal.

EXAMPLE 24

*N-(trans - 4 - undecyl - 1 - dodecyl-L-prolyl)lincosamine ditetradecyl mercaptal and a mixture of two N-(trans-4-undecyl-1 - dodecyl-L-prolyl)lincosamine tetradecyl methyl mercaptals*

In the manner given in Example 3, tetradecanethiol, hydrochloric acid and methyl N-(trans-4-undecyl-1-dodecyl-L-prolyl)-α-thiolincosaminide were reacted to give a mixture of products which was separated by chromatography into:

(A) N-(trans-4-undecyl-1 - dodecyl-L-prolyl)lincosamine ditetradecyl mercaptal,
(B) A mixture of two N-(trans-4-undecyl-1-dodecyl-L-prolyl)lincosamine tetradecyl methyl mercaptals,
(C) A small fraction of N-(trans-4-undecyl-1-dodecyl-L-prolyl)lincosamine dimethyl mercaptal.

EXAMPLE 25

*N-(cis-4-hexyl-1-ethyl-L-prolyl)lincosamine dibenzyl mercaptal and a mixture of N-(cis-4-hexyl-1-ethyl-L-prolyl)lincosamine benzyl methyl mercaptals*

In the manner given in Example 3, benzyl mercaptan, hydrochloric acid and methyl N-(cis-4-hexyl-1-ethyl-L-prolyl)-α-thio-lincosaminide were reacted to give a mixture of products which was separated by chromatography into:

(A) N-(cis-4-hexyl-1-ethyl-L-prolyl)lincosamine dibenzyl mercaptal,
(B) A mixture of two N-(cis-4-hexyl-1-ethyl-L-prolyl) lincosamine benzyl methyl mercaptals,
(C) A small fraction of N-(cis-4-hexyl-1-ethyl-L-prolyl) lincosamine dimethyl mercaptal.

EXAMPLE 26

*N-(trans-4-butyl-1-methyl-L-prolyl)lincosamine dithenyl mercaptal and a mixture of N-(trans-4-butyl-1-methyl-L-prolyl)lincosamine thenyl methyl mercaptals*

In the manner given in Example 3, thenyl mercaptan, hydrochloric acid and methyl N-(trans-4-butyl-1-methyl-L-prolyl)-α-thiolincosaminide were reacted to give a mixture of products which was separated by chromatography into:

(A) N-(trans-4-butyl-1-methyl-L-prolyl)lincosamine dithenyl mercaptal,
(B) A mixture of two N-(trans-4-butyl-1-methyl-L-prolyl)lincosamine thenyl methyl mercaptals,
(C) A small fraction of N-(trans-4-butyl-1-methyl-L-prolyl)lincosamine dimethyl mercaptal.

EXAMPLE 27

*N-(cis-4-octyl-1-butyl-D-prolyl)lincosamine dioctadecyl mercaptal and a mixture of N-(cis-4-octyl-1-butyl-D-prolyl)lincosamine octadecyl methyl mercaptals*

In the manner given in Example 3, octadecanethiol, hydrochloric acid and methyl N-(cis-4-octyl-1-butyl-D-prolyl)-α-thio-lincosaminide were reacted to give a mixture of products which was separated by chromatography into:

(A) N-(cis-4-octyl-1-butyl-D-prolyl)lincosamine dioctadecyl mercaptal, (B) A mixture of two N-(cis-4-octyl-1-butyl-D-prolyl)lincosamine octadecyl methyl mercaptals,
(C) A small fraction of N-(cis-4-octyl-1-butyl-D-prolyl)lincosamine dimethyl mercaptal.

EXAMPLE 28

N-(trans-4 - nonyl-1-propyl-D - prolyl)lincosamine ditridecyl mercaptal and a mixture of N-(trans-4-nonyl-1-propyl-D-prolyl)lincosamine tridecyl methyl mercaptals In the manner given in Example 3, tridecanethiol, hydrochloric acid and methyl N-(trans-4-nonyl-1-propyl-D-prolyl)-α-thiolincosaminide were reacted to give a mixture of products which was separated by chromatography into:

(A) N-(trans-4-nonyl-1-propyl-D-prolyl)lincosamine ditridecyl mercaptal,
(B) A mixture of two N-(trans-4-nonyl-1-propyl-D-prolyl)lincosamine tridecyl methyl mercaptals,
(C) A small fraction of N-(trans-4-nonyl-1-propyl-D-prolyl)lincosamine dimethyl mercaptal.

EXAMPLE 29

N-(cis-4 - heptyl-1-hexyl-D - prolyl)lincosamine diheptyl mercaptal and a mixture of N-(cis-4-heptyl-1-hexyl-D-prolyl)lincosamine heptyl methyl mercaptals In the manner given in Example 3, heptanethiol, hydrochloric acid and methyl N-(cis-4-heptyl-1-hexyl-D-prolyl)-α-thiolincosaminide were reacted to give a mixture of products which was separated by chromatography into:

(A) N-(cis-4-heptyl-1-hexyl-D-prolyl)lincosamine diheptyl mercaptal,
(B) A mixture of two N-(cis-4-heptyl-1-hexyl-D-prolyl)lincosamine heptyl methyl mercaptals,
(C) A small fraction of N-(cis-4-heptyl-1-hexyl-D-prolyl)lincosamine dimethyl mercaptal.

EXAMPLE 30

N-(trans-4-propyl-L-hygroyl)celestosamine dibutyl mercaptal and a mixture of N-(trans-4-propyl-L-hydrogyl)celestosamine butyl 2-hydroxyethyl mercaptals In the manner given in Example 3, butyl mercaptan, hydrochloric acid and celesticetin were reacted to give a mixture of products which was separated by chromatography into:

(A) N-(trans-4-propyl-L-hygroyl)celestosamine dibutyl mercaptal,
(B) A mixture of two N-(trans-4-propyl-L-hygroyl)celestosamine butyl 2-hydroxyethyl mercaptals,
(C) A small fraction of N-(trans-4-propyl-L-hygroyl)celestosamine bis(2-hydroxyethyl) mercaptal.

EXAMPLE 31

N-(cis-4-propyl-D-hygroyl)celestosamine dibenzyl mercaptal and a mixture of N-(cis-4-propyl-D-hygroyl)celestosamine benzyl 2-hydroxyethyl mercaptals In the manner given in Example 3, benzyl mercaptan, hydrochloric acid and 2-hydroxyethyl N-(cis-4-propyl-D-hygroyl)-α-thiocelestosaminide were reacted to give a mixture of products which was separated by chromatography into:

(A) N-(cis - 4 - propyl-D-hygroyl)celestosamine dibenzyl mercaptal,
(B) A mixture of two N-(cis-4-propyl-D-hygroyl)celestosamine benzyl 2-hydroxyethyl mercaptals,
(C) A small fraction of N-(cis-4-propyl-D-hygroyl)celestosamine bis(2-hydroxyethyl) mercaptal.

EXAMPLE 32

N-(trans-4-propyl-L-hygroyl)lincosamine dihexyl mercaptal and a mixture of N-(trans-4-propyl-L-hygroyl)lincosamine hexyl ethyl mercaptals In the manner given in Example 3, hexane-thiol, hydrochloric acid and ethyl N-(trans-4-propyl-L-hygroyl)-α-thiolincosaminide were reacted to give a mixture of products which was separated by chromatography into:

(A) N - (trans - 4-propyl-L-hygroyl)lincosamine dihexyl mercaptal,
(B) A mixture of two N-(trans-4-propyl-L-hygroyl)lincosamine hexyl ethyl mercaptals,
(C) A small fraction of N - (trans-4-propyl-L-hygroyl)lincosamine diethyl mercaptal.

EXAMPLE 33

N-(cis-4-propyl-D-hygroyl)lincosamine dithenyl mercaptal and a mixture of N-(cis-4-propyl-D-hygroyl)lincosamine thenyl ethyl mercaptals In the manner given in Example 3, thenyl mercaptan, hydrochloric acid and ethyl N-(cis-4-propyl-D-hygroyl)-α-thiolincosaminide were reacted to give a mixture of products which was separated by chromatography into:

(A) N - (cis - 4-propyl-D-hygroyl)lincosamine dithenyl mercaptal,
(B) A mixture of two N-(cis-4-propyl-D-hygroyl)lincosamine thenyl ethyl mercaptals,
(C) A small fraction of N-(cis-4-propyl-D-hygroyl)lincosamine diethyl mercaptal.

EXAMPLE 34

N-(trans-4-propyl-L-hygroyl)-1-deoxylincosaminol

A suspension of 100 g. of commercially available Raney nickel (grade W–3), washed before use with water until a pH of 7 was obtained and then washed 3 times with absolute alcohol, was stirred and heated to reflux in 1 l. of absolute ethanol with 15 g. of N-(trans - 4 - propyl-L-hygroyl)lincosamine dimethyl mercaptal. After 4 hours, the hot reaction mixture was filtered and the nickel was washed with 600 ml. of hot ethanol. The combined filtrate and washings were evaporated to dryness. The residue was subjected to a 5-tube countercurrent distribution (60 ml. per phase) in the system 1-butanol:water. The contents of tubes 4 and 5 were evaporated to dryness, giving 7 g. of residue which was crystallized from 100 ml. of ethyl acetate; yield, 5.7 g. of N-(trans-4-propyl-L-hygroyl)-1-deoxylincosaminol of melting point 105–108° C. and the following analysis:

Analysis.—Calcd. for $C_{17}H_{34}N_2O_6$: C, 56.33; H, 9.46; N, 7.73. Found: C, 56.23, 56.29; H, 9.16, 9.30; N, 7.68.

Instead of ethanol, other lower alkanols having from 1 to 6 carbon atoms can be used, for example, methanol, 1- and 2-propanol, butanol, pentanol, hexanol, and the like.

In the manner given in Example 34, N-(trans-4-propyl-L-hygroyl)-1-deoxylincosaminol can be produced by treating other dialkylmercaptals, e.g., N-(trans-4-propyl-L-hygroyl)lincosamine dibutyl mercaptal (Example 3), N-(trans-4-propyl-L-hygrol)lincosamine butyl methyl mercaptal mixture (Example 3), N-(trans - 4 - propyl-L-hygroyl)lincosamine dihexyl mercaptal (Example 4) and the like, with a Raney nickel catalyst and lower alkanol, e.g., methanol, ethanol, propanol, 2-propanol, butanol and the like.

In the manner given in Example 34, treating N-(1,4-dialkylprolyl)lincosamine dialkyl mercaptals, dibenzyl mercaptal, dithenyl mercaptal, with nickel and a lower alkanol, e.g., ethanol, gives the corresponding N-(1,4-dialkylprolyl) - 1 - deoxylincosaminol. Representative 1-deoxylincosaminols thus obtained include:

N-(trans-4-ethyl-L-hygroyl)-1-deoxylincosaminol,
N-(trans-4-decyl-1-butyl-L-prolyl)-1-deoxylincosaminol, N-(trans-4-octyl-1-ethyl-L-prolyl)-1-deoxylincosaminol,
N-(cis-4-prolyl-1-ethyl-L-prolyl)-1-deoxylincosaminol,
N-(trans-4-pentyl-1-decyl-D-prolyl)-1-deoxylincosaminol,
N-(cis-4-methyl-1-octyl-L-prolyl)-1-deoxylincosaminol,
N-(cis-4-hexyl-1-dodecyl-L-prolyl)-1-deoxylincosaminol,
N-(cis-4-methyl-1-octyl-D-prolyl)-1-deoxylincosaminol,
N-(trans-4-decyl-1-butyl-L-prolyl)-1-deoxylincosaminol,
N-(trans-4-octyl-1-ethyl-L-prolyl)-1-deoxylincosaminol,
N-(cis-4-heptyl-1-dodecyl-L-prolyl)-1-deoxylincosaminol,
N-(cis-4-nonyl-1-butyl-D-prolyl)-1-deoxylincosaminol,
N-(trans-4-undecyl-1-ethyl-L-prolyl)-1-deoxylincosaminol, and the like.

In the manner given in Example 34, heating N-(1,4-dialkylprolyl)celestosamine dialkyl mercaptals with nickel and lower alkanol, e.g., ethanol, gives the corresponding N-(1,4-dialkylprolyl)-1-deoxycelestosaminol (Formula III, R=CH₃). Representative compounds thus obtained include:

N-(trans-4-propyl-1-methyl-L-prolyl)-1-deoxycelestosaminol,
N-(cis-4-butyl-1-ethyl-D-prolyl)-1-deoxycelestosaminol,
N-(trans-4-pentyl-1-propyl-D-prolyl)-1-deoxycelestosaminol,
N-(trans-4-hexyl-1-propyl-L-prolyl)-1-deoxycelestosaminol,
N-(cis-4-dodecyl-1-propyl-L-prolyl)-1-deoxylincosaminol,
N-trans-4-octyl-1-hexyl-D-prolyl)-1-deoxycelestosaminol,
N-(cis-4-heptyl-1-decyl-L-prolyl)-1-deoxycelestosaminol, and the like.

EXAMPLE 35

*N-(trans-4-propyl-L-hygroyl)-1-methylthio-1-deoxylincosaminol*

A 200-ml. volume of Raney nickel, loosely packed in water suspension, was washed 4 times with absolute ethanol. The thus-prepared Raney nickel was heated under reflux for 4 hours with 30 g. (0.066 mole) of N-(trans-4-propyl-L-hygroyl)lincosamine dimethyl mercaptal in 1200 ml. of ethanol. The hot suspension was filtered, the nickel was washed 3 times with boiling ethanol, and the washings and filtrate were combined and evaporated to dryness. In this manner a residue was obtained which was recrystallized twice from boiling ethyl acetate, yielding 13.6 g. of crystalling product. 10 g. of this product was subjected to a 200-transfer countercurrent distribution (Craig) in a system consisting of 1-butanol: Skellysolve B (hexanes):water in a ratio of 2:3:5. Two major fractions were obtained; one with K=1.04 and the other with K=3.26. The peak fraction of K=1.04 consisted of 3 g. of N-(trans-4-propyl-L-hygroyl)-1-deoxylincosaminol of the following formula:

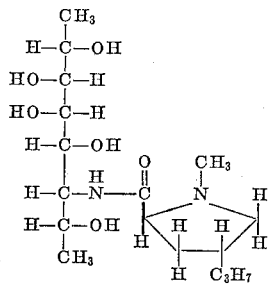

The peak fraction of K=3.26 yielded on evaporation 4.18 g. of product which was recrystallized from ethyl acetate; yield, 3 g. of white, crystalline N-(trans-4-propyl-L-hygroyl)-1-methylthio-1-deoxylincosaminol of melting point 124–126° C. and the following analysis:

*Analysis.*—Calcd. for $C_{18}H_{36}N_2O_6S$: C, 52.91; H, 8.88; N, 6.86; S, 7.85. Found: C, 52.82; H, 8.15; N, 7.26; S, 8.25.

N-(trans-4-propyl-L-hygroyl)-1-methylthio-1-deoxylincosaminol has the formula:

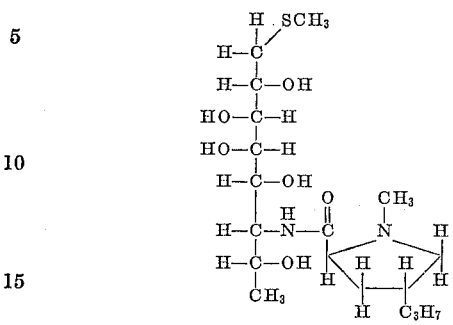

In the manner given in Example 35, heating of an N-(1,4-dialkylprolyl)lincosamine (or celestosamine) dialkyl mercaptal with Raney nickel in absolute ethanol gives the corresponding N-(1,4-dialkylprolyl)-1-alkylthio-1-deoxylincosaminol (or celestosaminol). Representative compounds thus prepared include:

N-(trans-4-butyl-1-ethyl-L-prolyl)-1-methylthio-1-deoxylincosaminol,
N-(trans-4-pentyl-1-hexyl-L-prolyl)-1-ethylthio-1-deoxylincosaminol,
N-(trans-4-hexyl-1-methyl-L-prolyl)-1-butylthio-1-deoxylincosaminol,
N-(trans-4-heptyl-1-methyl-D-prolyl)-1-dodecylthio-1-deoxylincosaminol,
N-(cis-4-octyl-1-butyl-L-prolyl)-1-hexadecylthio-1-deoxylincosaminol,
N-(cis-4-nonyl-1-octyl-L-prolyl)-1-octadecylthio-1-deoxylincosaminol,
N-(trans-4-decyl-1-ethyl-L-prolyl)-1-benzylthio-1-deoxylincosaminol,
N-(cis-4-ethyl-1-butyl-D-prolyl)-1-thenylthio-1-deoxylincosaminol,
N-(cis-4-isopropyl-1-pentyl-D-prolyl)-1-pentadecylthio-1-deoxylincosaminol,
N-(trans-4-undecyl-1-decyl-L-prolyl)-1-octylthio-1-deoxylincosaminol,
N-(trans-4-butyl-1-methyl-D-prolyl)-1-thenylthio-1-deoxylincosaminol,
N-(cis-4-dodecyl-1-decyl-D-prolyl)-1-benzylthio-1-deoxylincosaminol,
N-(trans-4-propyl-1-methyl-L-prolyl)-1-ethylthio-1-deoxycelestosaminol,
N-(cis-4-butyl-1-octyl-D-prolyl)-1-hexylthio-1-deoxycelestosaminol,
N-(trans-4-decyl-1-decyl-D-prolyl)-1-octylthio-1-deoxycelestosaminol,
N-(cis-4-dodecyl-1-hexyl-L-prolyl)-1-benzylthio-1-deoxycelestosaminol, and the like.

The above N-(1,4-dialkylprolyl)-1-alkyl (or respectively, 1-thenyl, 1-benzyl)-thio-1-deoxylincosaminols (or respectively, thio-1-deoxycelestosaminols) can be further heated with Raney nickel catalyst in a lower alkanol to give the corresponding N-(1,4-dialkylprolyl)-1-deoxylincosaminol.

EXAMPLE 36

*1-deoxylincosaminol (IV; R=H)*

A solution of 1 g. of N-(trans-4-propyl-L-hygroyl)-1-deoxylincosaminol was heated under reflux in about 50 ml. of 4 N sulfuric acid for a period of 4 hours. Thereafter, the mixture was cooled and treated with saturated barium hydroxide solution until a pH of 8 was reached. The mixture was filtered, the filtrate was passed through a ¾-inch column containing 10 g. of an anion exchange resin (Dowex 2 in the hydroxyl cycle), and the effluent was freeze dried, yielding 200 mg. of a white solid.

Crystallization from absolute ethanol of 120 mg. of this solid gave 40 mg. of a product melting at 177–185° C., which upon further recrystallization gave 1-deoxylincosaminol melting at 178–181° C. and having an analysis as follows:

Analysis.—Calcd. for $C_8H_{19}NO_5$: C, 45.92; H, 9.15; N, 6.69. Found: C, 46.29; H, 9.24; N, 6.40.

In the manner given in Example 36, other N-(1,4-dialkylprolyl)-1-deoxylincosaminols wherein the alkyl groups contain from 1 to 12 carbon atoms, inclusive, produced as in Example 34, can be submitted to hydrolysis with a strong acid, e.g., sulfuric, hydrochloric, hydrobromic acid and the like to give 1-deoxylincosaminol (IV; R=H).

EXAMPLE 37

*1-deoxylincosaminol*

A mixture of 10 g. of N-(cis-4-propyl-1-methyl-D-prolyl)-1-deoxylincosaminol and 100 g. of hydrazine hydrate was heated under reflux for a period of 6 days. The hydrazine hydrate was thereupon evaporated in vacuo in a nitrogen atmosphere, yielding a residue. This residue was crystallized from hot acetonitrile (100 ml.), yielding 1-deoxylincosaminol which was further recrystallized from absolute ethanol to yield pure 1-deoxylincosaminol of melting point 178–180° C.

EXAMPLE 38

*1-deoxycelestosaminol (IV; R=methyl) (7-O-methyl-1-deoxylincosaminol)*

A mixture of 10 g. of N-(trans-4-propyl-L-hygroyl)-celestosaminol and 100 g. of hydrazine hydrate was heated under reflux for a period of 6 days. The hydrazine hydrate was thereupon evaporated in vacuo in a nitrogen atmosphere, yielding a residue. This residue was crystallized from hot acetonitrile (100 ml.), yielding 1-deoxycelestosaminol which was purified by recrystallization from absolute ethanol.

In the manner given in Example 38, 1-deoxycelestosaminol (IV; R=CH₃) can be obtained from other N-(1,4-dialkylprolyl)-1-deoxycelestosaminols wherein the alkyl groups contain from 1 to 12 carbon atoms, inclusive, by hydrazinolysis.

EXAMPLE 39

*N-acetyl-1-deoxylincosaminol*

To 1 g. (0.0048 mole) of 1-deoxylincosaminol in 100 ml. of methanol at 5° C. was added 1 g. (0.01 mole) of acetic anhydride. The mixture was thereupon stirred until a solution resulted; it was then refrigerated at between 0 and 5° C. After 20 hours, 300 ml. of ether was added to the reaction mixture and the resulting precipitate was recovered by filtration. In this manner, 800 mg. of dried white solid was obtained, which was recrystallized from 30 ml. of absolute ethanol to yield 630 mg. of white, crystalline N-acetyl-1-deoxylincosaminol of melting point 174–176° C.

EXAMPLE 40

*N-propionyl-1-deoxylincosaminol*

In the manner given in Example 39, 1-deoxylincosaminol was reacted with propionic anhydride in methanol at room temperature for a period of 4 hours giving N-propionyl-1-deoxylincosaminol.

EXAMPLE 41

*N-butyryl-1-deoxylincosaminol*

In the manner given in Example 39, 1-deoxylincosaminol was reacted with butyric anhydride for 6 hours in methyl alcohol giving N-butyryl-1-deoxylincosaminol.

EXAMPLE 42

*N-valeryl-1-deoxylincosaminol*

In the manner given in Example 39, 1-deoxylincosaminol and valeric anhydride were reacted in methanol solution given N-valeryl-1-deoxylincosaminol.

EXAMPLE 43

*N-lauroyl-1-deoxylincosaminol*

1 g. of 1-deoxylincosaminol, suspended in 20 ml. of triethylamine, was cooled to about 10° C. and to this suspension was added 1 ml. of lauroyl chloride. The mixture was kept at minus 10° C. overnight and then diluted with 25 ml. of ether. The liquids were thereupon decanted and the remaining material was concentrated to dryness, washed with a small quantity of water, and recrystallized from absolute ethanol to give N-lauroyl-1-deoxylincosaminol.

EXAMPLE 44

*N-benzoyl-1-deoxylincosaminol*

To 700 mg. (0.003 mole) of 1-deoxylincosaminol in 50 ml. of absolute ethanol was added 1 g. of benzoic anhydride. The mixture was stirred until the solids originally present had dissolved and a precipitate began to form. The reaction mixture was allowed to stand overnight at room temperature and was filtered thereafter, yielding 730 mg. (70% yield) of white crystals of N-benzoyl-1-deoxylincosaminol of melting point 188–190° C. and the following analysis:

Analysis.—Calcd. for $C_{15}H_{23}NO_6$: C, 57.49; H, 7.40; N, 4.47. Found: C, 57.33; H, 7.45; N, 4.22.

EXAMPLE 45

*N-cyclopentanepropionyl-1-deoxylincosaminol*

In the manner given in Example 39, 1-deoxylincosaminol was reacted with cyclopentanepropionic anhydride in methanol at room temperature for a period of 6 hours to give N-cyclopentanepropionyl-1-deoxylincosaminol.

In the manner given in Example 39, reacting 1-deoxylincosaminol with other acid anhydrides such as hexanoic, heptanoic, octanoic, nonanoic, decanoic, undecanoic anhydride in a lower alkanol such as methanol, ethanol, propanol, isopropanol, or the like results in the corresponding N-acyl-1-deoxylincosaminol. Representative N-acyl-1-deoxylincosaminols include N-hexanoyl-, -heptanoyl-, -octanoyl-, -nonanoyl-, -decanoyl-, -phenylacetyl-, -phenylpropionyl-, -undecanoyl-1-deoxylincosaminol and the like.

EXAMPLE 46

*N-acetyl-1-deoxycelestosaminol*

In the manner given in Example 39, 1-deoxycelestosaminol was reacted with acetic anhydride in methanol at room temperature for a period of 4 hours giving N-acetyl-1-deoxycelestosaminol.

EXAMPLE 47

*N-butyryl-1-deoxycelestosaminol*

In the manner given in Example 39, 1-deoxycelestosaminol was reacted with butyric anhydride for 6 hours in methyl alcohol giving N-butyryl-1-deoxycelestosaminol.

EXAMPLE 48

*N-valeryl-1-deoxycelestosaminol*

In the manner given in Example 39, 1-deoxycelestosaminol and valeric anhydride were reacted in methanol solution giving N-valeryl-1-deoxycelestosaminol.

EXAMPLE 49

*N-lauroyl-1-deoxycelestosaminol*

1 g. of 1-deoxycelestosaminol, suspended in 20 ml. of triethylamine, was cooled to about 10° C. and to this suspension was added 1 ml. of lauroyl chloride. The mixture was kept at minus 10° C. overnight and then diluted with 25 ml. of ether. The liquids were thereupon decanted and the remaining material was concentrated to dryness, washed with a small quantity of water, and recrystallized from absolute ethanol to give N-lauroyl-1-deoxycelestosaminol.

EXAMPLE 50

*N-benzoyl-1-deoxycelestosaminol*

To 700 mg. (0.003 mole) of 1-deoxycelestosaminol in 50 ml. of absolute ethanol was added 1 g. of benzoic anhydride. The mixture was stirred until the solids originally present had dissolved and a precipitate began to form. The reaction mixture was allowed to stand overnight at room temperature and was filtered thereafter to give white crystals of N-benzoyl-1-deoxycelestosaminol.

EXAMPLE 51

*N-phenylacetyl-1-deoxycelestosaminol*

In the manner given in Example 39, 1-deoxycelestosaminol and phenylacetic anhydride were reacted in methanol solution giving N-phenylacetyl-1-deoxycelestosaminol.

EXAMPLE 52

*N-cyclopentanepropionyl-1-deoxycelestosaminol*

In the manner given in Example 39, cyclopentanepropionic anhydride was reacted with 1-deoxycelestosaminol in absolute ethanol giving N-cyclopentanepropionyl-1-deoxycelestosaminol.

In the manner given in Example 39, reacting 1-deoxycelestosaminol with other acid anhydrides such as propionic, hexanoic, heptanoic, octanoic, nonanoic, decanoic, phenylpropionic, undecanoic anhydride in a lower alkanol such as methanol, ethanol, propanol, isopropanol, or the like results in the corresponding N-acyl -1-deoxycelestosaminol. Representative N-acyl-1-deoxycelestosaminols include N-propionyl-, -hexanoyl-, -heptanoyl-, -octanoyl-, -nonanoyl-, -decanoyl-, -phenylpropionyl-, -undecanoyl-1-deoxylincosaminol, and the like.

I claim:

1. A compound of the formula:

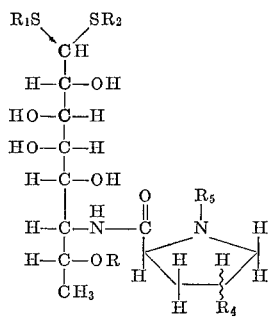

wherein R is selected from the group consisting of hydrogen and methyl, wherein $R_1$ and $R_2$ are selected from the group consisting of alkyl radicals having from 1 to 18 carbon atoms, inclusive, and benzyl and thenyl, and wherein $R_4$ and $R_5$ are alkyl radicals having from 1 to 12 carbon atoms, inclusive.

2. N-(trans-4-propyl-L-hygroyl)lincosamine dimethyl mercaptal of the formula:

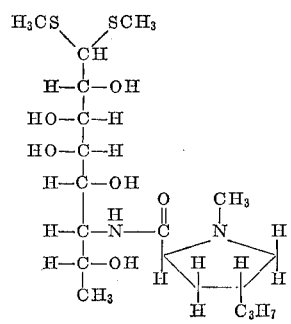

3. N - (trans - 4 - propyl - L - hygroyl)lincosamine diethyl mercaptal.

4. N - (trans - 4 - propyl - L - hygroyl)lincosamine dibutyl mercaptal.

5. A diastereoismeric mixture of two N-(trans-4-propyl-L-hygroyl)lincosamine butyl methyl mercaptals having a melting point between 120–130° C.

6. A compound of the formula:

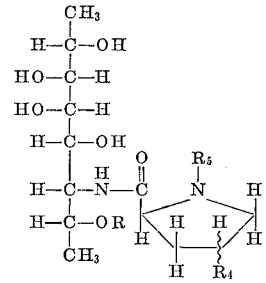

wherein R is selected from the group consisting of hydrogen and methyl, and wherein $R_4$ and $R_5$ are alkyl radicals having from 1 to 12 carbon atoms, inclusive.

7. N - (trans - 4 -propyl - L - hygroyl) - 1 - deoxylincosaminol having the formula:

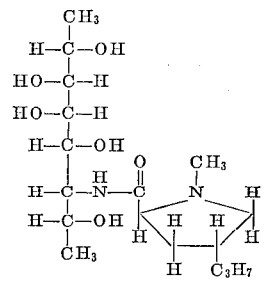

8. N - (trans - 4 - propyl - L - hygroyl) - 1 - deoxycelestosaminol of the formula:

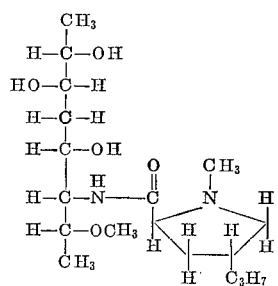

9. A compound of the formula:

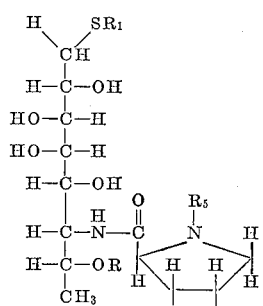

wherein R is selected from the group consisting of hydrogen and methyl, wherein $R_1$ is selected from the group consisting of alkyl radicals having from 1 to 18 carbon atoms, inclusive, and benzyl and thenyl, and wherein $R_4$ and $R_5$ are alkyl radicals having from 1 to 12 carbon atoms, inclusive.

10. N-(trans-4-propyl-L-hygroyl) - 1-methylthio - 1-deoxylincosaminol having the formula:

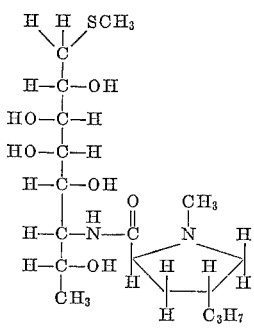

11. A compound of the formula:

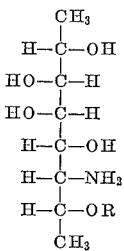

wherein R is selected from the group consisting of methyl and hydrogen.

12. 1-deoxylincosaminol having the formula:

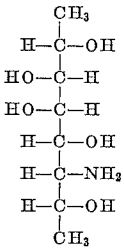

13. A compound of the formula:

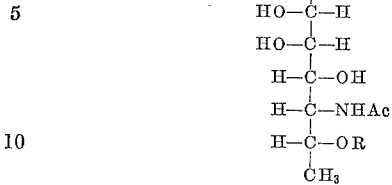

wherein R is selected from the group consisting of hydrogen and methyl, and wherein Ac is the acyl radical of an acid selected from the group of alkanoic and phenylalkanoic acids having from 2 to 12 carbon atoms, inclusive.

14. N-acetyl-1-deoxylincosaminol.
15. N-benzoyl-1-deoxylincosaminol.
16. N-acetyl -1-deoxycelestosaminol of the formula:

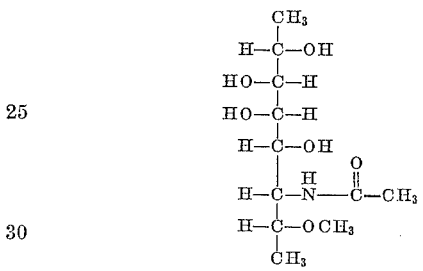

References Cited by the Examiner

Newman et al.: J. Am. Chem. Soc., vol. 72, p. 4296 (1950).

Noller: Chemistry of Organic Compounds, pp. 237, 246, 382 (1957).

Sidgwick: Organic Chemistry of Nitrogen (1937), p. 398.

ALEX MAZEL, *Primary Examiner.*

HENRY R. JILES, JOSEPH A. NARCAVAGE,
*Assistant Examiners.*